United States Patent
Itoh et al.

(10) Patent No.: US 9,332,173 B2
(45) Date of Patent: May 3, 2016

(54) IMAGING DEVICE HAVING MOTION DETECTOR AND IN-FOCUS POSITION ESTIMATING UNIT, AND IMAGING METHOD

(75) Inventors: Kei Itoh, Yokohama (JP); Kazuya Niyagawa, Yokohama (JP)

(73) Assignee: RICOH COMPANY, LTD., Tokyo (JP)

( * ) Notice: Subject to any disclaimer, the term of this patent is extended or adjusted under 35 U.S.C. 154(b) by 407 days.

(21) Appl. No.: 13/382,095

(22) PCT Filed: Jul. 22, 2010

(86) PCT No.: PCT/JP2010/062737
§ 371 (c)(1),
(2), (4) Date: Jan. 3, 2012

(87) PCT Pub. No.: WO2011/010745
PCT Pub. Date: Jan. 27, 2011

(65) Prior Publication Data
US 2012/0105710 A1    May 3, 2012

(30) Foreign Application Priority Data

Jul. 23, 2009    (JP) .................. 2009-172558
Mar. 2, 2010    (JP) .................. 2010-045936

(51) Int. Cl.
| | |
|---|---|
| *G03B 13/00* | (2006.01) |
| *H04N 5/232* | (2006.01) |
| *G03B 13/36* | (2006.01) |
| *H04N 5/262* | (2006.01) |
| *G02B 7/28* | (2006.01) |

(Continued)

(52) U.S. Cl.
CPC ............ *H04N 5/23212* (2013.01); *G03B 13/36* (2013.01); *H04N 5/23245* (2013.01); *H04N 5/23293* (2013.01); *H04N 5/2628* (2013.01); *G02B 7/28* (2013.01); *H04N 5/144* (2013.01); *H04N 2101/00* (2013.01)

(58) Field of Classification Search
CPC ............... G03B 13/36; H04N 5/23245; H04N 5/23293; H04N 5/2628; H04N 5/23212; H04N 5/144; H04N 2101/00; G02B 7/28
USPC ............... 348/208.99, 208.4, 208.11–208.14, 348/169, 347–348, 352; 396/52, 55
See application file for complete search history.

(56) References Cited

U.S. PATENT DOCUMENTS

| | | | |
|---|---|---|---|
| 6,430,368 | B1 | 8/2002 | Hata |
| 7,738,028 | B2 | 6/2010 | Nakahara |

(Continued)

FOREIGN PATENT DOCUMENTS

| | | | |
|---|---|---|---|
| JP | 39-5265 | A | 4/1964 |
| JP | 2003-185912 | A | 7/2003 |

(Continued)

*Primary Examiner* — Twyler Haskins
*Assistant Examiner* — Carramah J Quiett
(74) *Attorney, Agent, or Firm* — Blank Rome LLP

(57) ABSTRACT

An imaging device is configured to include an imaging lens, an imaging unit which acquires image data based on an optical image of a subject received via the imaging lens, a motion detector which detects a motion of the subject based on image data sequentially obtained from the imaging unit, a focus detector which calculates focus position data based on the image data obtained from the imaging lens when the motion detector detects a motion of the subject, and an in-focus position estimating unit which estimates an in-focus position based on the calculated focus position data.

12 Claims, 24 Drawing Sheets

(51) Int. Cl.
  *H04N 5/14* (2006.01)
  *H04N 101/00* (2006.01)

(56) References Cited

U.S. PATENT DOCUMENTS

| | | | |
|---|---|---|---|
| 7,953,318 B2 * | 5/2011 | Takagi | 396/98 |
| 8,184,192 B2 * | 5/2012 | Sakaguchi | 348/333.05 |
| 2008/0031611 A1 | 2/2008 | Konishi | |
| 2009/0116830 A1 | 5/2009 | Kumagai | |

FOREIGN PATENT DOCUMENTS

| | | |
|---|---|---|
| JP | 2005-202064 A | 7/2005 |
| JP | 2006-91915 A | 4/2006 |
| JP | 3851027 B2 | 11/2006 |
| JP | 2007-13512 A | 1/2007 |
| JP | 2008-58559 A | 3/2008 |
| JP | 2008-233156 A | 10/2008 |
| JP | 2009-31702 A | 2/2009 |

* cited by examiner

INFINITE ──────▶ NEAR
FOCUS LENS MOVING DIRECTION

FOCUS LENS MOVING DIRECTION

FIG.31

|         | Wide | Tele |
|---------|------|------|
| INFINITE | 0 | 0 |
| 2m | 5 | 10 |
| 1m | 10 | 20 |
| 0.5m | 20 | 40 |
| 0.1m | 50 | 100 |
| 0.05m | 100 | 200 |

IMAGING DEVICE HAVING MOTION DETECTOR AND IN-FOCUS POSITION ESTIMATING UNIT, AND IMAGING METHOD

CROSS REFERENCE TO RELATED APPLICATION

The present application is based on and claims priority from Japanese Patent Applications No. 2009-172558, filed on Jul. 23, 2009 and No. 2010-45936, filed on Mar. 2, 2010, the disclosure of which is hereby incorporated by reference in its entirety.

TECHNICAL FIELD

The present invention relates to an imaging device having an autofocus function which can quickly focus a subject even if the subject moves as well as to an imaging method using the imaging device.

BACKGROUND ART

Imaging devices such as a digital camera generally incorporate an autofocus (AF) unit to automatically focus a subject. For example, a so-called hill climb autofocus control method for the AF unit is known (disclosed in Japanese Examined Laid-open Patent Publication No. 39-5265 (Reference 1), for example). The hill climb autofocus control is to focus a subject based on an AF evaluation value indicating a degree of focus which is calculated by integrating differences in brightness of neighboring pixels included in video signals which are output from an image sensor according to an optical image of a subject via an imaging lens.

When a subject is in focus, the edge portion of a subject image is sharp and clear while when a subject is not in focus, the edge portion thereof blurs. Moreover, a difference in brightness of video signals of neighboring pixels of a subject image in in-focus state is large and that in non-in-focus state is small. That is, the AF evaluation value is maximal in in-focus state.

The AF unit is configured to acquire a video signal of a subject image at a predetermined timing while moving an imaging lens, calculate an AF evaluation value according to the video signal at each timing, and focus the subject by automatically moving the imaging lens to a position in which a video signal with a maximal AF evaluation value is obtained. Thus, by the hill climb autofocus control, the imaging lens is automatically moved to an in-focus position by detecting the maximal value of AF evaluation values calculated with predetermined timing while moving the imaging lens.

Note that the position of the imaging lens in the in-focus state is referred to as in-focus position and a range in which the imaging lens is moved to calculate the AF evaluation value is referred to as focus search range.

Japanese Patent No. 3851027 (Reference 2) discloses a more precise, high-speed hill autofocus control which comprises a first mode in which the AF evaluation value is calculated with a minute interval and a second mode in which the AF evaluation value is sampled with a rough interval until the imaging lens approaches the in-focus position and it is calculated with a minute interval when the imaging lens is in the vicinity of the in-focus position, for example. By using the first and second modes separately, it is possible to perform the autofocus operation at high speed and more quickly bring a subject into focus.

Further, Japanese Laid-open Patent Publication No. 2008-58559 (Reference 3) discloses an AF control method for focus re-adjustment after a subject is brought into focus, to store a subject image in a previous in-focus position and compare the previous image and a current image to calculate a matching degree and to narrow a focus search range when the matching degree is in a predetermined range, for example.

However, the AF control method disclosed in Reference 2 has a problem that when a subject in focus moves, performing minute sampling after rough sampling requires some time so that it is not possible to perform AF control quickly enough to deal with the moving. That is, a motion of a subject during the autofocus operation causes repetition of the autofocus, which may result in failing to capture the subject in focus. In order to solve this problem, there is a demand for a novel AF control to be able to follow motion in a subject image acquired via an imaging lens by controlling autofocus of the imaging lens to move in a minute range.

The AF control method disclosed in Reference 3 cannot be effective unless a subject is captured in the in-focus position. Since it is not configured to follow a subject over time or a change in the subject, it does not operate unless the subject is in focus, and takes a lot of time to complete the AF operation. Moreover, the focus search range is uniformly reduced irrespective of a lens position so that with a change in a distance from a subject, the AF control takes more time. In view of solving the problem, there is a demand for a novel AF control to be able to estimate an in-focus position by narrowing the focus search range and performing autofocus in a minute search range even without having the subject in focus, and as well as to be able to change the focus search range in accordance with which of the position on telephoto side or wide side the imaging lens is in for autofocus.

SUMMARY OF THE INVENTION

The present invention aims to provide an imaging device which can estimate an in-focus position when a subject image obtained via an imaging lens moves by moving the imaging lens in a minute search range so as to quickly perform autofocus. Further, it aims to provide an imaging device which can improve estimation accuracy of an in-focus position by changing the focus search range in accordance with the position of the imaging lens when a subject moves to quickly perform autofocus.

In one aspect of the present invention, an imaging device is configured to include an imaging lens, an imaging unit which acquires image data based on an optical image of a subject received via the imaging lens, a motion detector which detects a motion of the subject from image data sequentially obtained from the imaging unit, a focus detector which calculates focus position data based on the image data obtained via the imaging lens when the motion detector detects a motion of the subject; and an in-focus position estimating unit which estimates an in-focus position based on the calculated focus position data.

Preferably, the in-focus position estimating unit is configured to set at least one of a drive start position and a driving direction of the imaging lens based on the focus position data so that the imaging lens approaches the in-focus position.

Preferably, the focus position data is a resultant of a smooth differential operation based on an AF evaluation value calculated from the image data.

Preferably, the AF evaluation value is obtained by integrating a difference in brightness of neighboring pixels constituting the image data.

Preferably, the smooth differential operation is to calculate a sum of values obtained by weighted integration of a difference in AF evaluation values of neighboring pixels, and a weight coefficient used in the weighted integration is set so that the larger the difference in the AF evaluation values, the larger the weight coefficient.

Preferably, the in-focus position estimating unit is configured to move the imaging lens to the drive start position after estimating the in-focus position.

Preferably, when failing to estimate the in-focus position, the in-focus position estimating unit is configured to change the drive start position of the imaging lens and calculate the focus position data again.

Preferably, the focus detector comprises a drive range changing unit which is configured to change a drive range of the imaging lens according to a predetermined condition.

Preferably, the predetermined condition is a position of the imaging lens when the focus detector starts operating.

Preferably, the predetermined condition is a shooting mode when the focus detector starts operating.

Preferably, the predetermined condition is a focal length when the focus detector starts operating.

In another aspect of the present invention, provided is an imaging method by use of an imaging device which comprises an imaging lens, an imaging unit which acquires image data based on an optical image of a subject received via the imaging lens, a motion detector which detects a motion of the subject from image data sequentially acquired from the imaging unit, a focus detector which calculates focus position data based on the image data acquired via the imaging lens when the motion detector detects a motion of the subject, and an in-focus position estimating unit which estimates an in-focus position based on the calculated focus position data. The method comprises the steps of detecting a motion of a subject with the motion detector, the focus detector's driving the imaging lens from a predetermined position in a predetermined direction by a predetermined amount in accordance with the detected motion of the subject to acquire image data and acquiring focus position data based on the acquired image data, and the in-focus position estimating unit's estimating an in-focus position of the imaging lens based on the focus position data.

BRIEF DESCRIPTION OF THE DRAWINGS

These and other objects, features and advantages of the present invention will become apparent from a detailed description with reference to the following drawings:

FIG. 31 shows an example of the focal length and driving amount of an imaging lens of the imaging device according to the present invention.

DESCRIPTION OF EMBODIMENTS

Hereinafter, embodiments of the imaging device according to the present invention will be described in detail with reference to the accompanying drawings.

Figure 1:
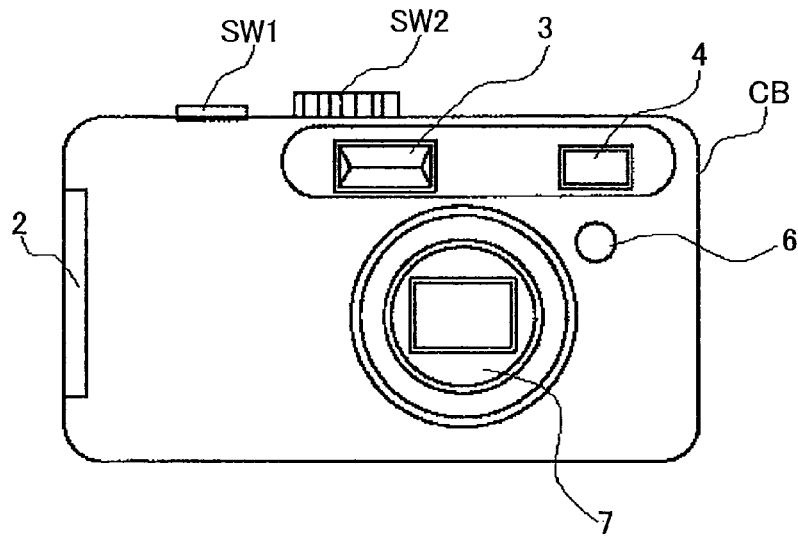
FIG. 1 is a front view of one example of the imaging device according to the present invention.
Figure 2:
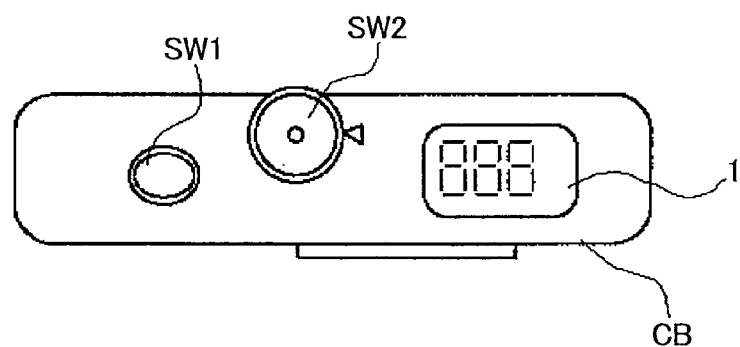
FIG. 2 is a top view of one example of the imaging device according to the present invention.
Figure 3:
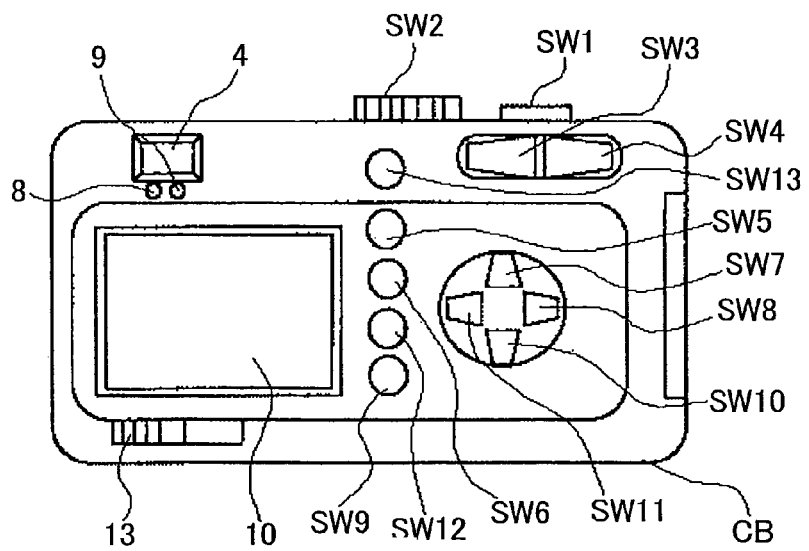
FIG. 3 is a back view of one example of the imaging device according to the present invention.

FIGS. 1 to 3 show the exterior of the imaging device (digital still camera, for example) according to one embodiment of the present invention, from front, top, back, respectively. In FIG. 1 a strobe light unit 3, an optical viewfinder 4, a remote control light receiver 6, a lens barrel unit (imaging lens) 7 including a zoom lens and a focus lens are provided on the front of a camera body CB as a housing of the imaging device. A lid of a memory card/battery room 2 is provided on one side of the camera body CB.

As shown in FIG. 2, on the top face of the camera body CB provided are a release button SW1, a mode dial SW2 and a sub liquid crystal display (LCD) 1.

In FIG. 3, the optical viewfinder 4, an autofocus light emitting diode (LED) 8, a stroboscopic LED 9, a LCD 10, a power switch SW13, a wide-angle zoom switch SW3, a telescopic zoom switch SW4, a self-timer set/reset switch SW5, a menu switch SW6, an upward/strobe switch SW7, a rightward switch SW8, a display switch SW9, a downward/macro switch SW10, a leftward/image check switch SW11, an OK switch SW12 and a quick access switch SW13 are provided on the back face of the camera body CB.

Figure 4:
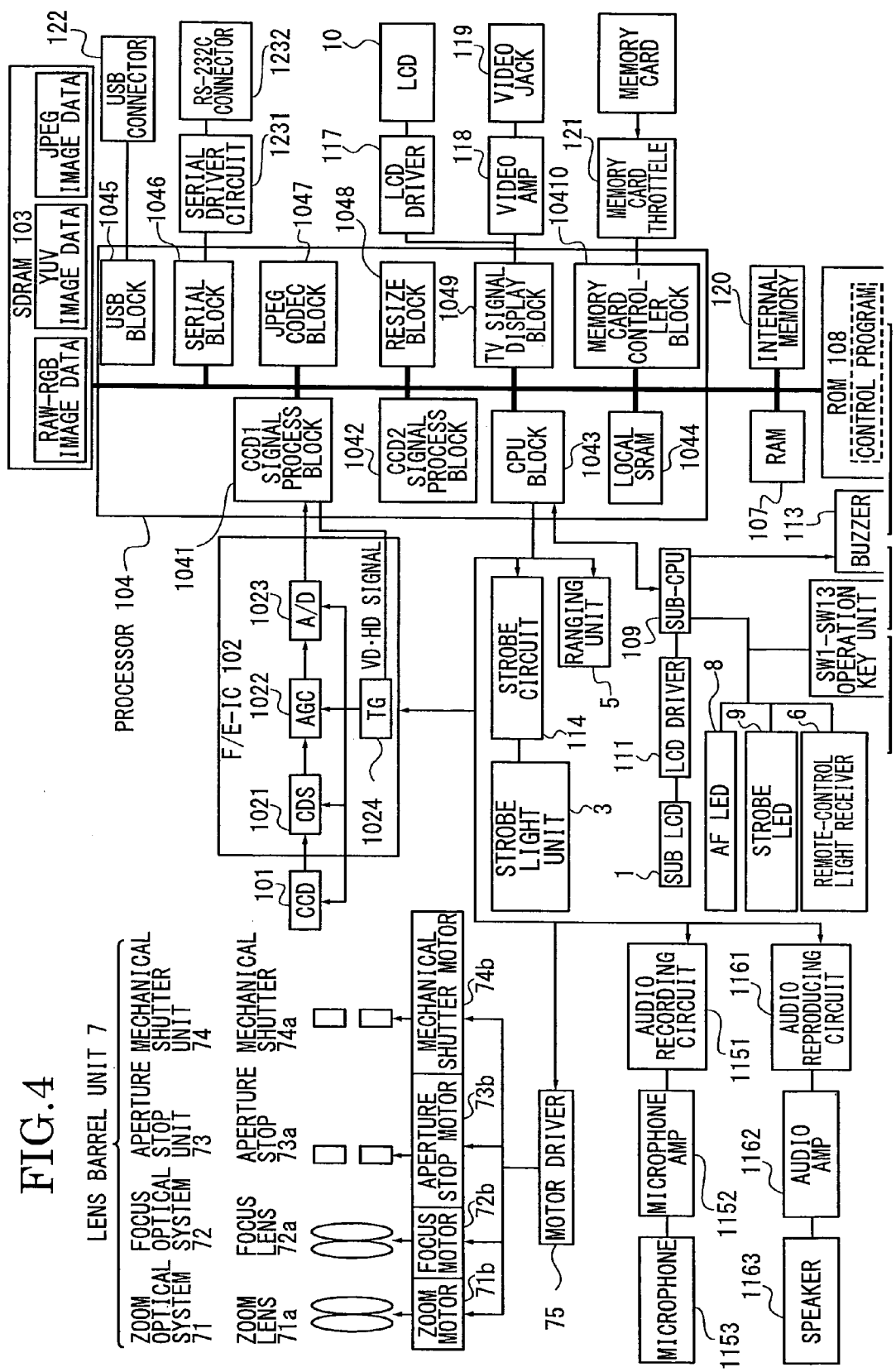
FIG. 4 is a function block diagram of one example of the imaging device according to the present invention.

Next, the function blocks of the imaging device according to one embodiment of the present invention are described with reference to FIG. 4. The operations (functions) of the imaging device are controlled by a processor 104 as a digital signal processing integrated circuit (IC). The processor 104 comprises a first charge coupled device (CCD1) signal processing block 1041, a second CCD (CCD2) signal processing block 1042, a CPU block 1043, a local SRAM (static random access memory) 1044, a USB (universal serial bus) block 1045, a serial block 1046, a JPEG CODEC block 1047, a resize block 1048, a TV signal display block 1049 and a memory card controller block 10410. These blocks are connected with each other by bus lines.

Outside of the processor 104 an SDRAM 103 (synchronous random access memory), a RAM 107, an internal memory 120, a ROM 108 which stores a control program are provided and connected to the processor 104 via a bus line. The SDRAM 103 stores RAW-RGB image data, YUV image data and JPEG image data of a captured subject image which will be collectively referred to as image data.

The lens barrel unit 7 comprises a zoom optical system 71 having a zoom lens 71a, a focus optical system 72 having a focus lens 72a, an aperture stop unit 73 having an aperture stop 73a and a mechanical shutter unit 74 having a mechanical shutter 74a. The optical zoom system 71, optical focus system 72, aperture stop unit 73 and mechanical shutter unit 74 are driven by a zoom motor 71b, a focus motor 72b, an aperture stop motor 73b and a mechanical shutter motor 74b, respectively. These motors are driven by a motor driver 75 which is controlled by the CPU block 1043 of the processor 104. The zoom motor 71b and the focus motor 72b are to move an imaging lens.

The zoom lens 71a and the focus lens 72a constitute the imaging lens which focuses a subject image on the imaging face of the CCD 101. The CCD 101 is an image sensor to convert the subject image into an electric image signal and output the image signal to an F/E (front end)-IC 102. The F/E-IC 102 includes a correlated double sampling (CDS) 1021, an automatic gain controller (AGC) 1022 and an analog-digital (A/D) converter 1023 to perform predetermined processings to the image signal, respectively. It also includes a timing generator (TG) 1024 to which a vertical drive (VD) signal and a horizontal drive (HD) signal are input from the first CCD signal processing block 1041 of the processor 104. The F/F-IC 102 processes image signals in synchronization with the VD/HD signals via the TG 1024.

The F/E-IC 102 converts the electric image signal from the CCD 101 into a digital signal and outputs it to the first CCD signal processing block 1041. The first CCD signal processing block 1041 performs signal processing such as white balance adjustment, γ adjustment to the digital signal and stores it as image data in the SDRAM 103 and outputs the VD/HD signals. The CCD 101, F/E-IC 102, first CCD signal processing block 1041 and CPU block 1043 constitute an imaging unit of the imaging device.

The CPU block 1043 of the processor 104 is configured to control an audio recording of an audio recording circuit 1151. Audio is converted into an audio recording signal by a microphone 1153, amplified by a microphone amplifier 1152 and recorded on the internal memory 120. The CPU block 1043 also controls operations of an audio reproducing circuit 1161. The audio reproducing circuit 1161 is configured to read audio data from the internal memory 120 and amplifies it with an audio amplifier 1162 for outputs from a speaker 1163. The CPU block 1043 also controls a stroboscopic circuit 114 to emit light from the strobe light unit 3, and controls a not-shown ranging unit.

Note that the imaging device according to one embodiment of the present invention is configured to perform autofocus operation based on image data acquired via the imaging lens (later described). Therefore, it is not always necessary for the ranging unit to measure a distance to the subject, and the imaging device can exclude the ranging unit. Alternatively, distance information obtained by the ranging unit can be used in strobe light emission control by the strobe circuit 114 or supplementarily used for focus control based on captured image data.

The CPU block 1043 is connected to a sub-CPU 109 disposed outside the processor 104 and the sub CPU 109 controls display on the sub LCD 1 via an LCD driver 111. The sub CPU 109 is connected with the autofocus LED 8, the strobe LED 9, the remote-control light receiver 6, an operation key unit having the switches SW1 to SW13 (FIG. 3), and a buzzer 113.

The USB block 1045 is connected to a USB connector 122, and the serial block 1046 is connected to a RS-232C connector 1232 through a serial driver circuit 1231. The TV signal display block 1049 is connected to the LCD 10 via an LCD driver 117 and to a video jack 119 via a video amplifier 118. The memory card controller block 10410 is connected to a contact point between a memory card throttle 121 and a memory card to electrically connect with the memory card when mounted in the throttle 121.

When the imaging device is set in a shooting mode with the mode dial SW2, the processor 104 detects the setting of the mode dial SW2 via the sub-CPU 109 and controls the motor driver 75 to move the lens barrel unit 7 to a photographable position. Further, it supplies power to the CCD 101, F/E-IC 102, LCD 10 and else to start operating. Upon the power-on, operations start in a viewfinder mode.

In the viewfinder mode, light from the subject is incident on the CCD 101 via the imaging lens of the lens barrel unit 7, converted into an electric signal thereby and output as RGB analog signals to the CDS 1021. Then, the RGB analog signals are transmitted via the AGC 1022 to the A/D converter 1023 and converted thereby into RGB digital signals. The digital signals are displayed on the LCD 10 or a television set via the TV signal display block 1049, video amplifier 118, and video jack 119.

The RGB digital signals converted by the A/D converter 1023 are converted into image data in YUV format by the second CCD signal processing block 1042 and stored in the SDRAM 103. The second CCD signal processing block 1042 converts the RGB image data into the YUV image data by proper processing such as filtering. The CPU block 1043 reads image data from the SDRAM 103 and transmits it to the LCD 10 for display. A process from the incidence of light from the subject to the display on the LCD 10 is repeated at an interval of 1/30 second, and display on the LCD 10 is updated in every 1/30 second in the viewfinder mode.

Now, AF operation and auto exposure (AE) operation of the imaging device according to one embodiment of the present invention is described. In the AF operation, the AF evaluation value indicating the degree of focus of at least part of image data and the AE evaluation value indicating the degree of exposure are calculated from image data which is input into the first CCD signal processing block 1041 via the imaging lens. The CPU block 1043 then determines a lens position with the maximum AF evaluation value to be an in-focus position and drives the focus motor 72b to move the imaging lens to the in-focus position.

Figure 5:
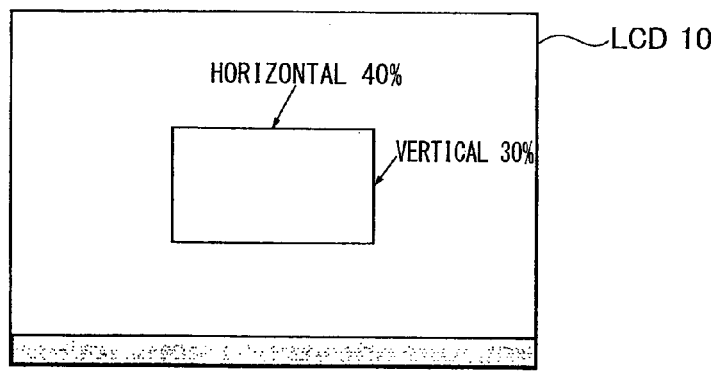
FIG. 5 shows an autofocus area of the imaging device according to the present invention.

The AF evaluation value is calculated from a specific area of image data obtained via the imaging lens. The specific area is referred to as AF area herein. FIG. 5 shows an example of the LCD 10 of the imaging device in the viewfinder mode and an example of the AF area about the center of LCD 10. The AF area is set in a size of horizontal 40%, vertical 30% of the total numbers of vertical and horizontal pixels constituting image data at the center of the screen. The size of the AF area should not be limited to the above example, and it can be set arbitrarily in accordance with AF processing time and AF accuracy. With a larger AF area, the autofocus accuracy improves but the AF processing time increases while with a smaller AF area, the autofocus accuracy decreases but the AF processing time shortens.

RGB digital signals are divided into areas (for example, horizontally 16×vertically 16) to find brightness data in each area. Pixels in each area having over a predetermined threshold are determined to be targets and brightness values thereof are added and multiplied by the number of target pixels to calculate the AE evaluation value. Proper exposure amount is calculated from a brightness distribution in each area and used for correcting the exposure of a next image frame.

The imaging device includes a plurality of shooting modes and the AF shooting range is differently set in accordance with each shooting mode. For example, the AF shooting range is from 1 m to infinite in a normal AF mode and from 1 cm to infinite in a macro AF mode. The AF mode is set with the mode dial SW2.

First Embodiment

Figure 6:
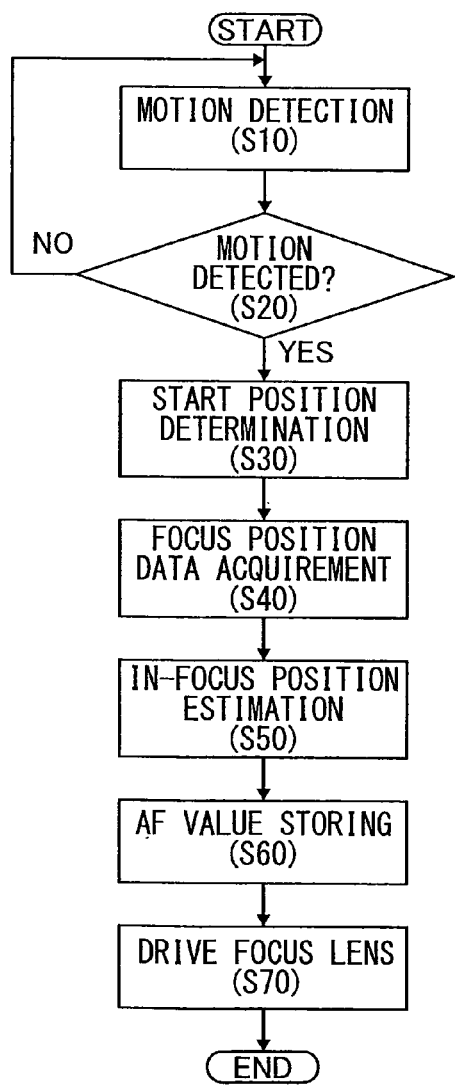
FIG. 6 is a flow chart for pre-autofocus operation of the imaging device according to the present invention.

Next, an imaging method using the imaging device according to the first embodiment of the present invention is described with reference to FIG. 6. FIG. 6 is a flowchart for pre-autofocus operation in steps S10, S20, S30, S40, S50, S60, S70.

According to the first embodiment, the pre-autofocus operation includes in-focus position estimation before the AF operation in order to find an in-focus position speedily. The pre-AF operation starts when a motion of a subject is detected from image data obtained via the imaging lens while the imaging device is operating in the viewfinder mode.

In the pre-autofocus operation, image data for use in estimation of an in-focus position is acquired while the imaging lens is moved in a narrower range than that in the AF operation. The AF operation is to determine an in-focus position based on the AF evaluation value which is calculated from image data acquired via the imaging lens moving in the entire movable range, upon press to the release button SW1, for example. In the following the pre-autofocus operation will be described in detail.

First, in a motion detection (motion detector) in step S10, a determination is made on whether or not a motion in a subject image is detected using image data in the AF area (FIG. 5). A motion in a subject image is detected when a difference among image data continuously obtained via the imaging lens exceeds a predetermined threshold and actual motion of a subject or the imaging device is not necessarily relevant.

With no detection of a motion in the subject image (No in step S20), the motion detection is repeated. With detection of a motion in the subject image (Yes in step S20), the flow proceeds to start position determination in step S30 to determine a drive start position of the imaging lens. In the start position determination the drive start position, a driving direction and focus search range (driving amount) of the imaging lens are set to acquire image data from which focus position data is acquired. The focus search range in the pre-autofocus corresponds to a driving amount less than that in the AF operation.

In focus position data acquirement (focus detector) in step S40, the focus lens 72a is moved from the set drive start position in the driving direction to acquire focus position data.

Then, in-focus position estimation (focus position estimating unit) in step S50 an in-focus position is estimated from a smooth differential value calculated in the focus position data acquirement in step S40.

In step S60 (AF value storing) an AF value is obtained from a result of the in-focus position estimation so that the imaging lens is to approach an in-focus position in the next pre-autofocus, and stored in the SDRAM 103. The AF value indicates information on the drive start position and driving direction.

In step S70 the imaging lens is moved to the drive start position based on the AF value stored in step S70, completing the pre-autofocus operation.

Next, each step of the pre-autofocus operation is described in detail. First, the motion detection (step S10) is described. The imaging device acquires image data from a subject image at predetermined timing. The focus lens 72a as the imaging lens is preset to drive by a predetermined amount in accordance with a single VD signal. With use of a pulse motor for the focus motor 72b, for example, a predetermined number of pulses corresponds to the lens driving amount. A drive pulse is supplied in line with falling of a pulse of a VD signal to drive the focus lens 72a. At the next falling of the VD signal pulse, the focus lens 72a is driven again by the predetermined driving amount. Thus, the focus lens 72a is driven in synchronization with the VD signal (or frame period).

Figure 7:
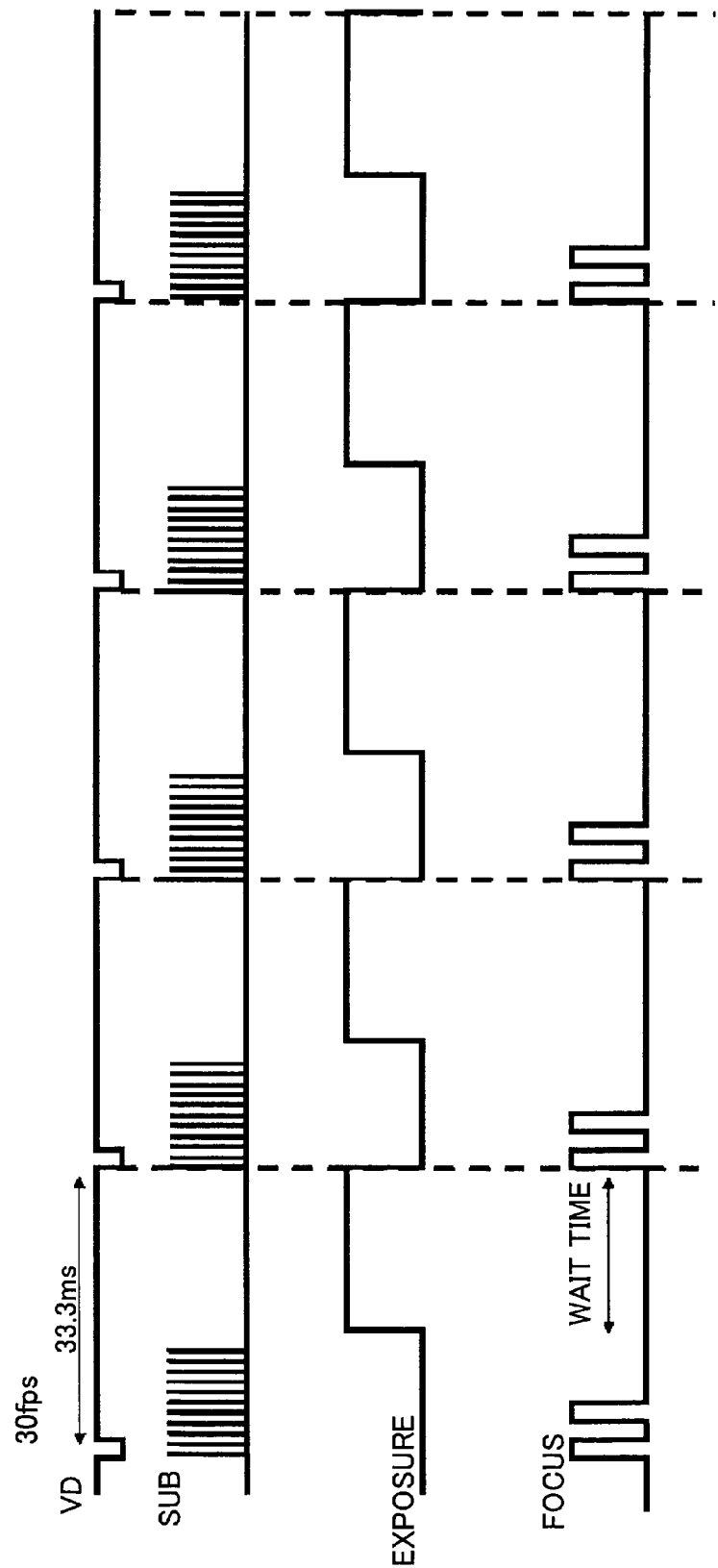
FIG. 7 is a timing chart showing timing at which focus position data is acquired by the imaging device according to the present invention.

FIG. 7 is a timing chart for the VD signal, driving timing for the focus lens synchronizing with the VD signal, discharge pulse (SUB) timing of the electric shutter, and exposure timing. As shown in FIG. 7, upon generation of a single VD signal, two pulses to drive the focus lens 72a are generated, and the focus lens 72a is moved by an amount corresponding to the two driving pulses. Also, triggered by the VD signal, a discharge pulse (sub pulse) is generated at predetermined times, and electric charges are discharged from the CCD 101 in accordance with the number of sub pulses to perform exposure operation. By exposure operation, a subject image is captured as image data. The number of driving pulses is variable with a focal length and a focus lens moving amount (driving range).

In the motion detection in step S10, image data is continuously acquired in synchronization with the VD signal as above and stored in a not-shown buffer memory of the SDRAM 103. Motion in a subject image is detected by comparing the image data stored and current image data based on an integration result of differences in brightness. For example, a difference in brightness between the image data stored last in the buffer memory and currently acquired image data is calculated and the image data stored in the buffer memory is overwritten with the current image data. Thus, a difference operation is repeated using image data acquired at a next timing.

The difference operation is to integrate differences in brightness of neighboring pixels among pixels comprising image data in both horizontal and vertical directions, compare a resultant with that acquired at a previous timing, and combine the differences in the horizontal and vertical directions to calculate a motion detection evaluation value Q. The motion detection evaluation value Q is calculated at timing at which the VD signal is generated.

An arithmetic expression (1) for the difference operation in the motion detection is as follows and H(v) is a result of integration of differences in brightness of neighboring pixels in the horizontal direction at a current timing:

$$H(v) = \sum_{i=Hstart}^{m-1} |D(i, v) - D(i, v+1)| \quad (1)$$

where D (i, v) is a coordinate of a pixel in the AF area, Hstart is a horizontal start position in the AF area, and m is a horizontal range of the AF area.

The arithmetic expression (2) is as follows. V(h) is a result of integration of differences in brightness of neighboring pixels in the vertical direction at a current timing.

$$V(h) = \sum_{j=Vstart}^{n-1} |D(h, j) - D(h+1, j)| \quad (2)$$

where D (h, j) is a coordinate of a pixel in the AF area, Vstart is a vertical start position in the AF area, and n is a vertical range of the AF area.

The total sum Q(t) of the results of H(v) and V(h) and results of H'(v) and V'(h) calculated at a previous timing is expressed by the following expression (3).

$$Q(t) = \sum_{v=Vstart}^{n-1} |H(v) - H'(v)| + \sum_{h=Hstart}^{m-1} |V(h) - V'(h)| \quad (3)$$

When a calculated motion evaluation value Q(t) is a predetermined threshold or more, a motion detection in a subject image is determined (Yes in step S20).

There may be a case where a difference in the image data by the above expressions exceeds the predetermined threshold due to a change in image data under light or dark condition or caused by camera shake. It is therefore preferable to set the threshold to an allowable value for the purpose of avoiding erroneous motion detection.

The imaging device according to the first embodiment of the present invention is configured to determine a motion of a subject by the above motion detection. However, the present invention should not be limited thereto. Other detection methods such as a difference extraction using histograms can be used. Also, an optical flow can be calculated from a difference in image data as long as processing speed is fast enough to deal with the calculation.

Figure 8:
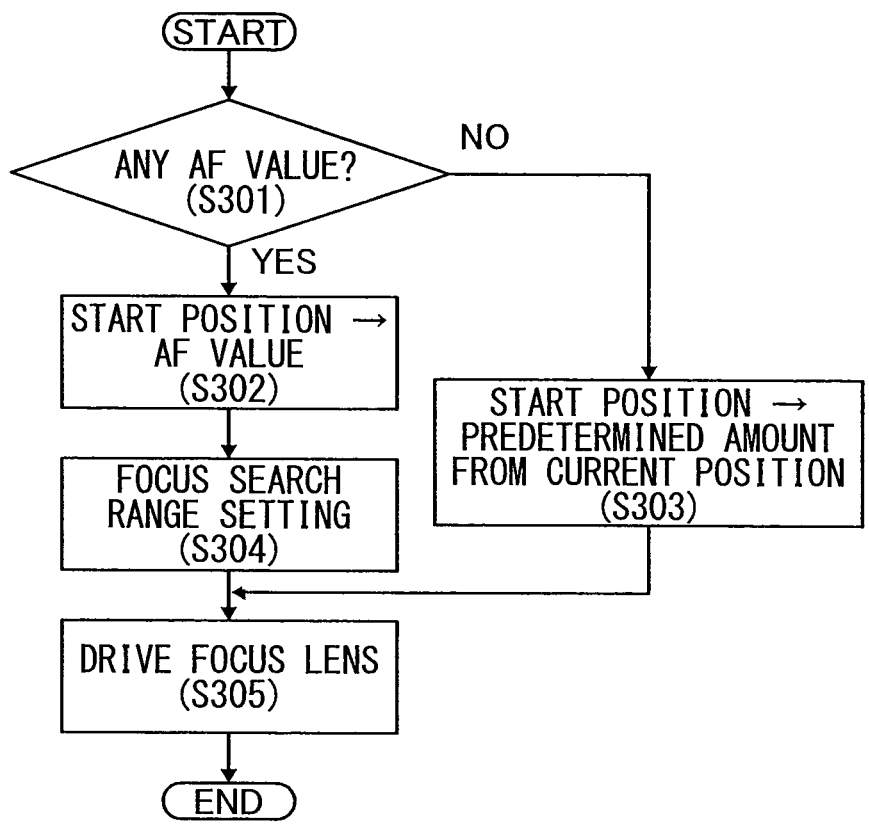
FIG. 8 is a flowchart for detailed pre-autofocus operation.

Next, the start position determination in step S30 is described with reference to FIG. 8. First, in step S301 a determination is made on whether or not the pre-autofocus operation has been performed and the AF value is stored in the SDRAM 103. With the AF value stored (Yes in step S301), the AF value is read from the SDRAM 103 to set the drive start position of the focus lens 72a based on the AF value in step S302.

With no AF value stored in a predetermined memory area of the SDRAM 103 (No in step S301), the drive start position of the focus lens 72a is set to a position moved by a predetermined amount from a current position in infinite direction and it is driven from infinite side to near side in step S303. This is because the imaging lens is moved from infinite side to near side for acquiring the AF evaluation value on which the in-focus position estimation data bases.

In step S304 the driving direction and the focus search range are set based on the read AF value and the focus lens 72a is moved to the drive start position in step S305, completing the drive start position determination (S30).

Figure 9:
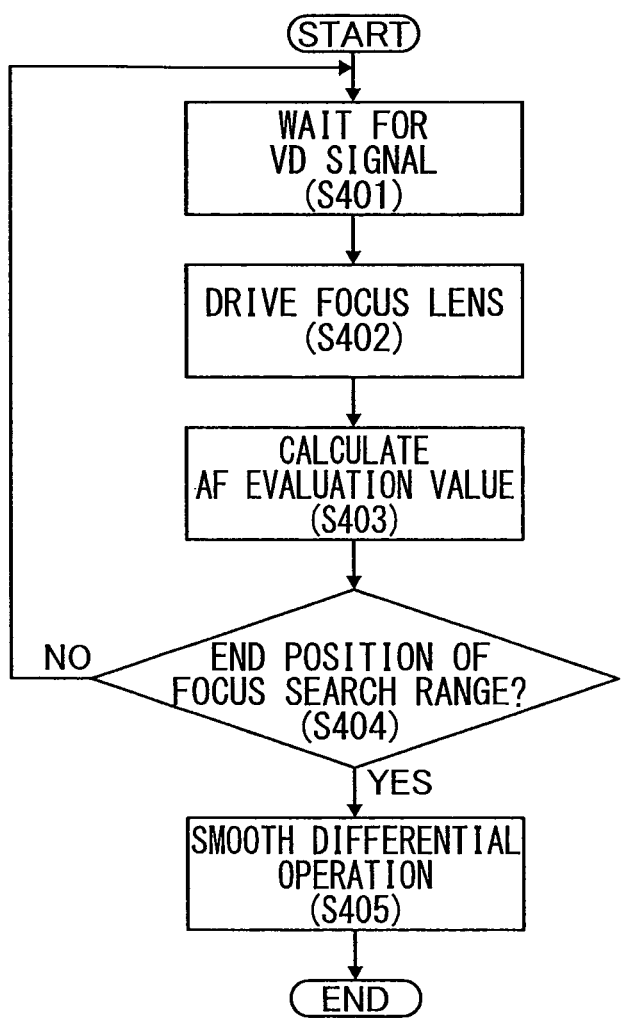
FIG. 9 is a flowchart for detailed pre-autofocus operation.

Next, the focus position data acquirement in step S40 is described with reference to FIG. 9. The focus position data is a smooth differential value calculated from the AF evaluation value. First, calculation of the AF evaluation value and smooth differential value in the imaging device according to the first embodiment of the present invention is described.

The smooth differential value Y[0] of the focus lens 72a in a current position is calculated by the following expression (4):

$$Y[O] = \left( \sum_{i=0}^{a} (x[i] - x[-i]) \times bi \right) \quad (4)$$

where X[0] is an AF evaluation value calculated from image data via the focus lens 72a in the current position, X[−i] is an AF evaluation value calculated from image data as "i" pieces before the current image data, X[i] is an AF evaluation value calculated from image data as "i" pieces after the current image data, and bi is a coefficient for the AF evaluation values (X[−i] to X[i]).

For calculating the smooth differential value Y[0] using the current AF evaluation value X[0] and three AF evaluation values preceding and succeeding the current AF evaluation value, Y[0]=(X[1]−X[−1])×1+(X[2]−X[−2])×2+(X[3]−X[−3])×3. Here, the weight coefficient (bi=1, 2, 3 . . . ) is set to be a smaller value as the AF evaluation value is closer to the current value X[0] (for example, X[1]) and set to be a larger value as it is further from the current value X[0] (for example, X[3]). Accordingly, an AF evaluation value less correlated with the current value X[0] is calculated with a larger coefficient bi. Specific coefficient values are not limited to the above example.

A relation between driving of the focus lens 72a and the smooth differential value is described with reference to FIGS. 10A, 10B and FIGS. 11A, 11B. In the graphs of FIGS. 10A, 10B and FIGS. 11A, 11B the abscissa axis indicates a total drivable range of the focus lens 72a and the longitudinal axis indicates the AF evaluation value calculated from image data obtained at each lens position.

Figure 10A:
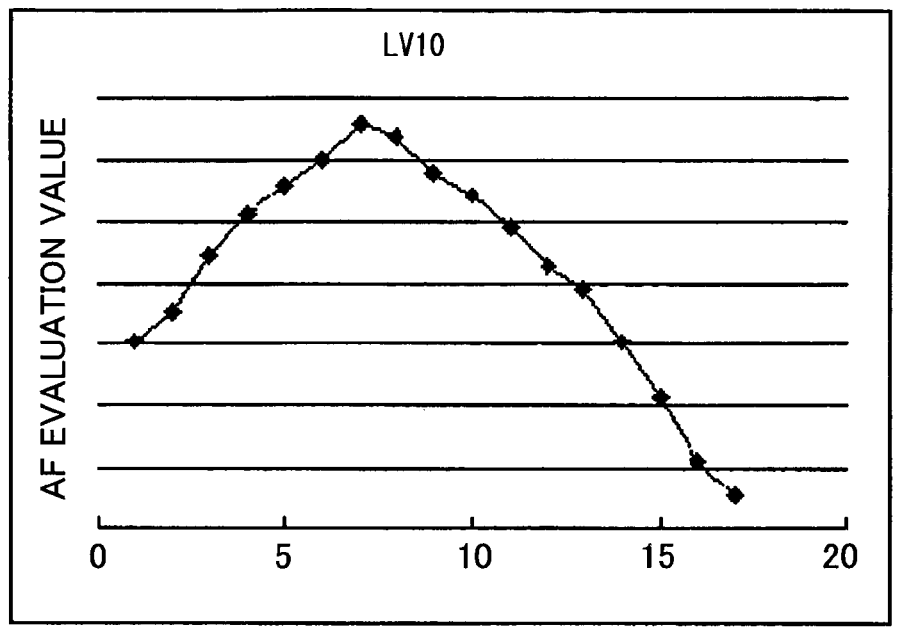
FIGS. 10A, 10B are graphs showing examples of a change in the AF evaluation value obtained in autofocus operation of the imaging device according to the present invention.
Figure 10B:
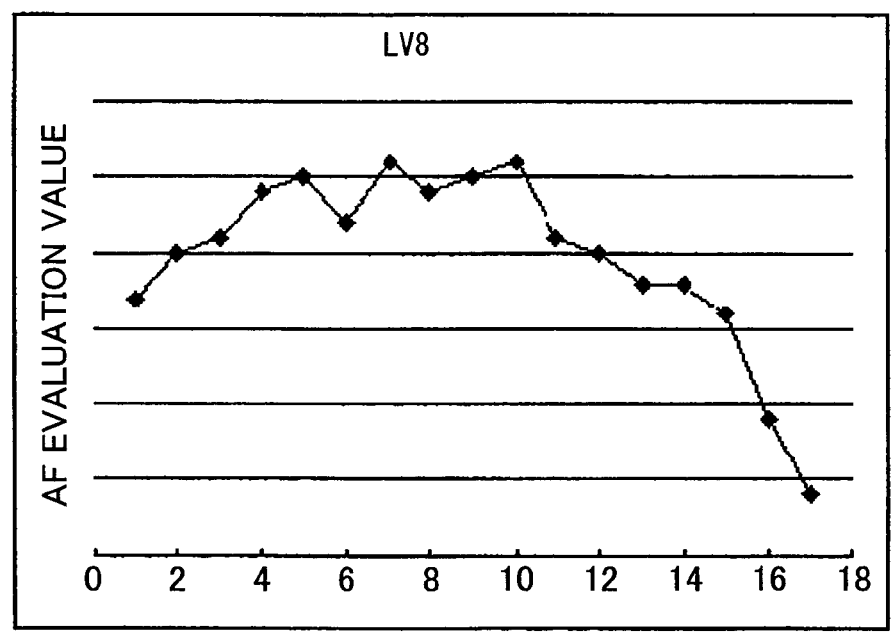

FIGS. 10A, 10B are examples of the AF evaluation values of a subject image captured at different light amounts at LV 10 and at LV8, respectively. FIG. 10B shows the AF evaluation value calculated from image data captured under a darker condition (less light amount). With a smaller light amount, a difference in brightness of neighboring pixels of a subject image will be very small and greatly affected by noise. As a result, the AF evaluation value will deviate and show plural peaks as shown in FIG. 10B. From the graph in FIG. 10A showing a single peak (maximal value), the peak can be easily decided to be the in-focus position while from that in FIG. 10B showing plural peaks, the in-focus position cannot be simply decided.

Figure 11A:
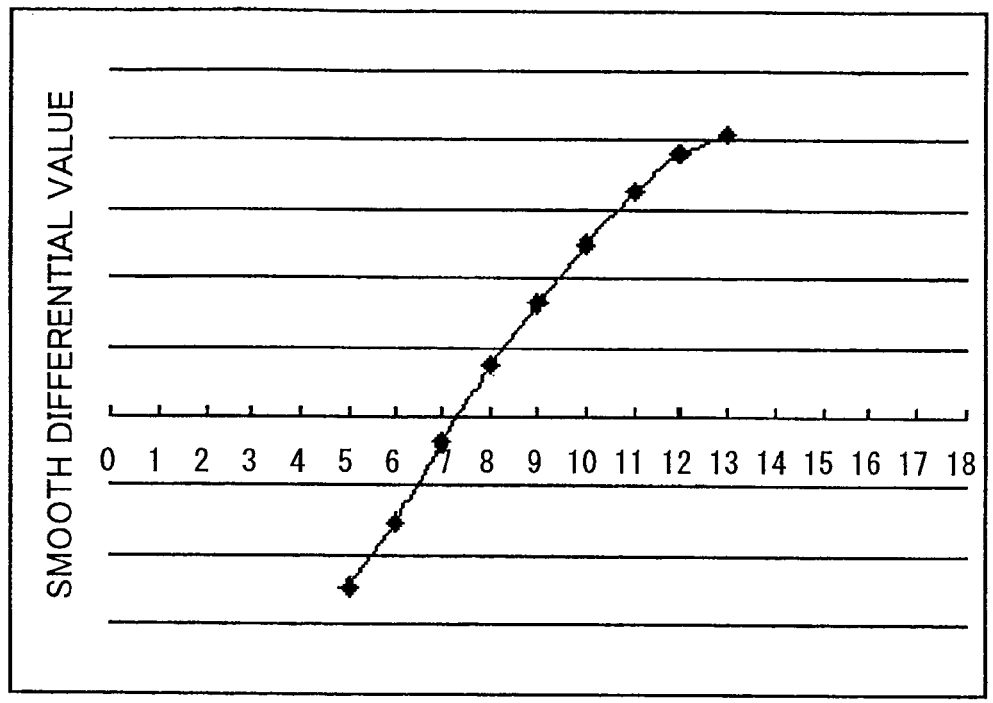
FIGS. 11A, 11B are graphs showing examples of a change in the smooth differential value calculated in autofocus operation of the imaging device according to the present invention.
Figure 11B:
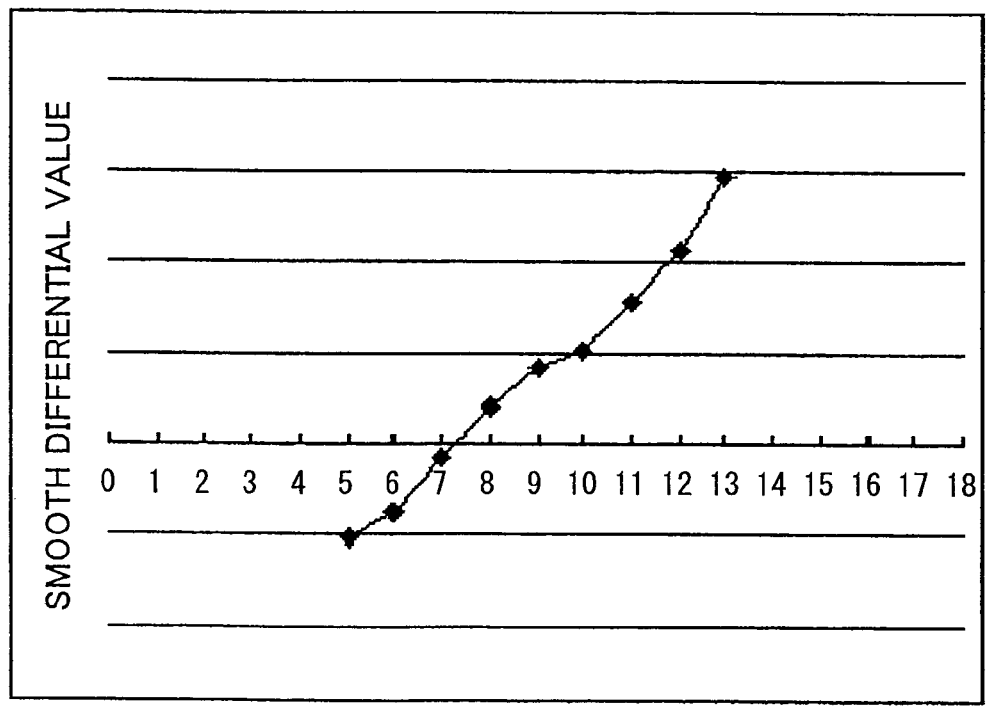

FIG. 11A shows an example of a change in the smooth differential value calculated from the AF evaluation value in FIG. 10A while FIG. 11B shows the same calculated from the AF evaluation value in FIG. 10B. As shown therein, the smooth differential value increases as the focus lens 72a moves and it inverses from negative to positive when exceeding a certain point. The AF evaluation value obtained at the inversion point is maximal and the lens position corresponding to this maximal AF evaluation value is to be the in-focus position. In other words, the lens position having the smooth differential value being zero is the in-focus position. Thus, using the smooth differential, it is possible to accurately determine the in-focus position even with a deviation in the AF evaluation value as shown in FIG. 11B.

Referring back to FIG. 9, in step S401 the flow waits for detection of falling of the VD signal. Upon detection of the falling, the focus motor 72b is driven in accordance with a predetermined pulse rate to drive focus lens 72a in step S402 and image data is acquired to calculate the AF evaluation value in step S403.

In step S404 a determination is made on whether or not the focus lens 72a has reached a preset end position of the focus search range. Steps S401 to S404 are repeated until the focus lens 72a reaches the end position (No in step S404). With the focus lens 72a being at the end position (Yes in step S404), the smooth differential value is calculated using obtained AF evaluation values in step S405.

Figure 12:
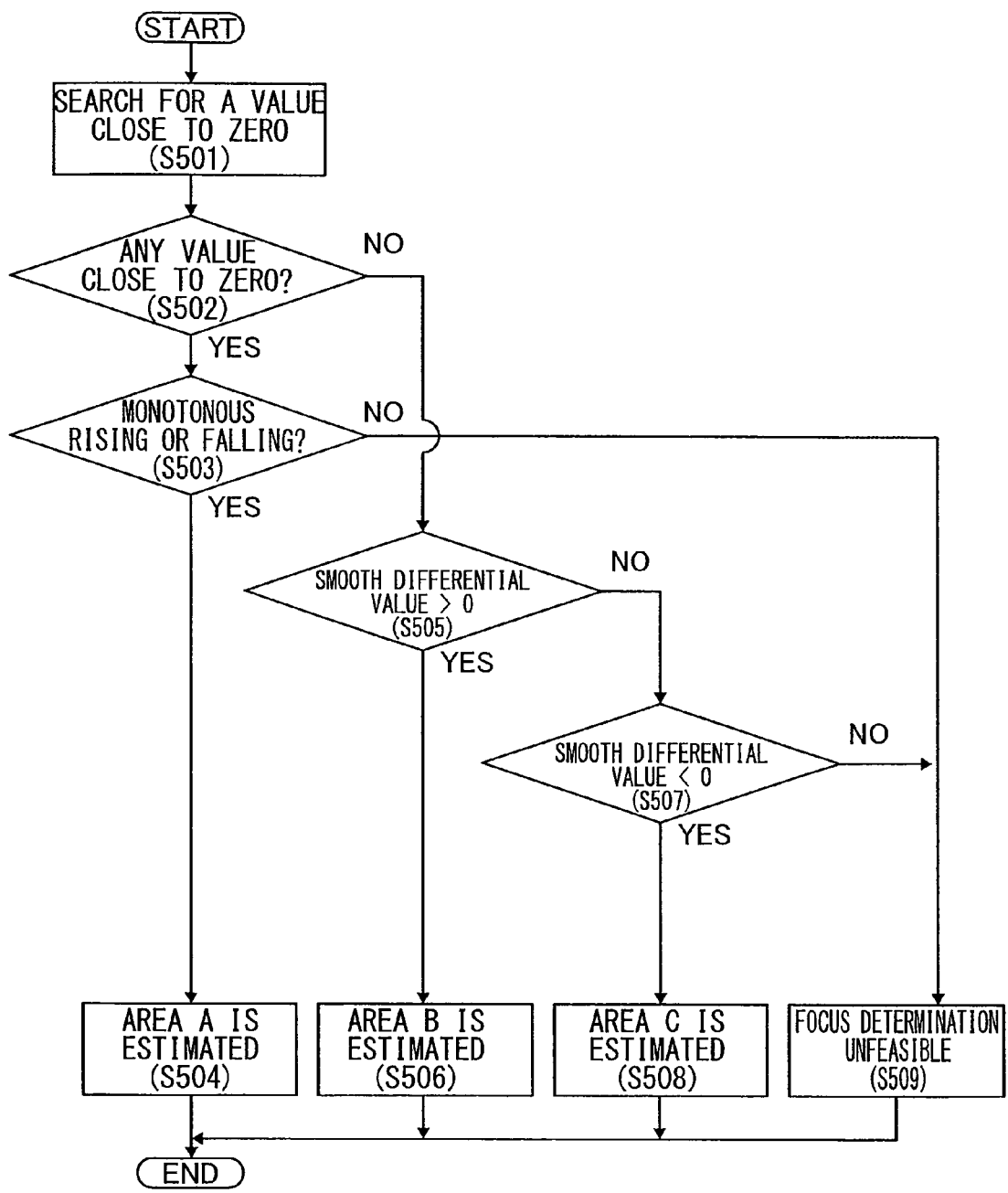
FIG. 12 is a flowchart for detailed pre-autofocus operation.
Figure 13:
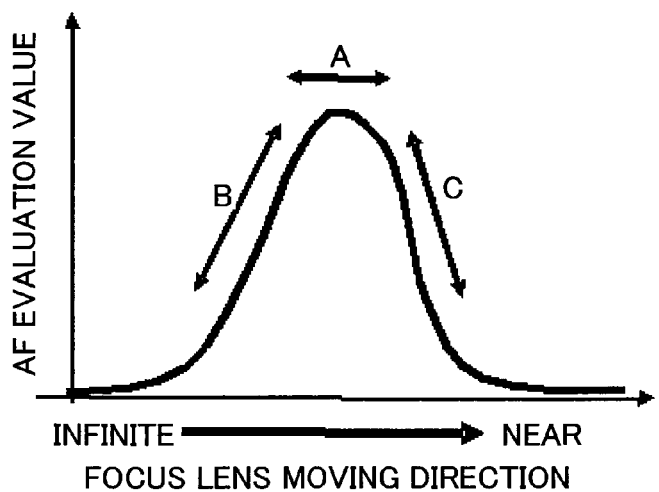
FIG. 13 is a graph showing an in-focus position estimation in the pre-autofocus operation.
Figure 14:
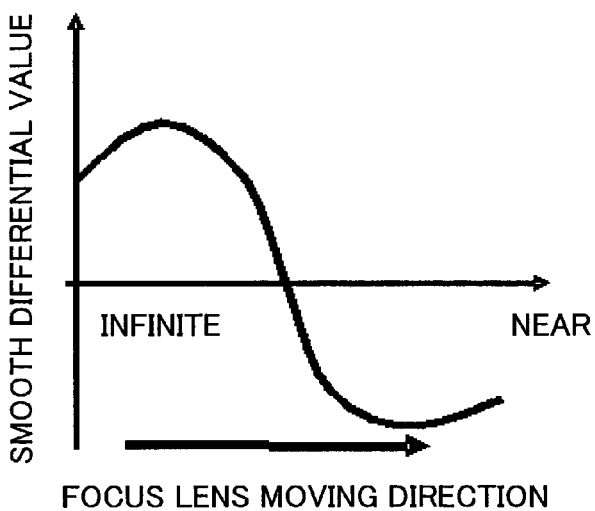
FIG. 14 is a graph showing an in-focus position estimation in the pre-autofocus operation.

Now, the in-focus position estimation in step S50 is described in detail with reference to FIG. 12. First, estimation of the in-focus position is roughly described. When the focus search range is set to the total drivable range of the focus lens 72a, the AF evaluation values calculated therein include the maximal value as shown in FIG. 13 and the lens position corresponding to the inversion point of the smooth differential value is determined as the in-focus position as shown in FIG. 14.

However, in the pre-autofocus the focus search range is set in such a small driving range of the focus lens as not to change angle of view so that it is not always possible to determine the inversion point of the smooth differential value calculated from the AF evaluation value in such a small driving range. That is, in step S40 the smooth differential value is calculated in any of areas A, B, C in FIG. 15.

Then, in the in-focus position estimation in step S50, first, a determination is made on whether or not there is a value close to zero among the calculated smooth differential values (step S501). When there is one (Yes in step S502), the flow proceeds to step S503 (periphery value determination).

The periphery value determination in step S503 is to determine whether or not a smooth differential value around the one close to zero monotonously falls or rises relative to the one close to zero. Specifically, when a smooth differential value acquired before the one close to zero is smaller than the one close to zero as well as a smooth differential value acquired after the one close to zero is larger than the one close to zero, it is determined that the smooth differential value monotonously rises. Oppositely, when a smooth differential value acquired before the one close to zero is larger than the one close to zero as well as a smooth differential value acquired after the one close to zero is smaller than the one close to zero, it is determined that the smooth differential value monotonously falls.

With monotonous rising or falling of the smooth differential value determined (Yes in S503), the focus lens position with the maximal AF evaluation value has to be among positions of the focus lens 72a corresponding to the smooth differential values, the one close to zero and values acquired before and after the one close to zero. That is, these smooth differential values are considered to be in the area A in FIG. 15 so that it can be estimated that the in-focus position of the focus lens has been detected (step S504).

When there is a smooth differential value close to zero (Yes in S502) and it does not monotonously rise or fall (No in S503), unfeasibility of detection of the in-focus position is determined, completing the in-focus position estimation in step S509.

With no smooth differential value close to zero, the in-focus position is estimated from the calculated smooth differential values. It is not possible to specify the in-focus position based only on the calculated smooth differential values because the focus search range is set in a small area in the pre-autofocus operation as described above.

With no smooth differential value close to zero in No in step S502, a determination is made on whether or not all the calculated smooth differential values are positive values in step S505. With all the values being positive (Yes in step S505), it can be estimated that the smooth differential values calculated in the focus position data acquirement step S40 belong to the area B in FIG. 15 in step S506. The calculated values being in the area B means that there is no in-focus position in the focus search range the focus lens 72a has moved but it is to be found by moving the focus lens 72a in the same driving direction.

Figure 15:
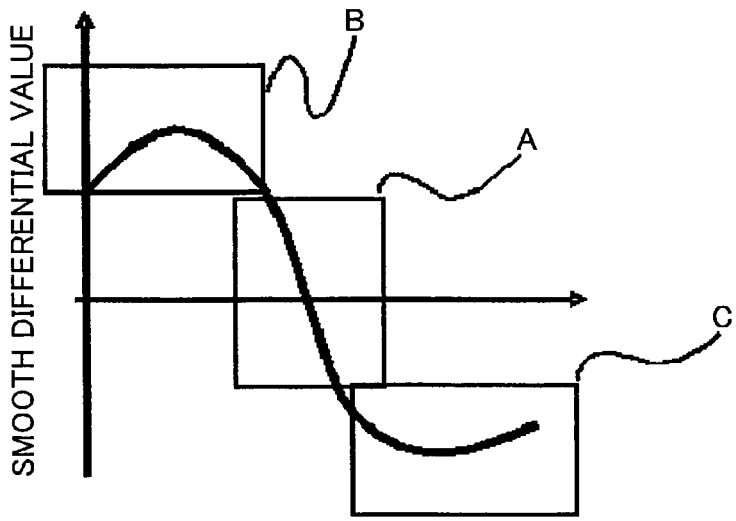
FIG. 15 is a graph showing an in-focus position estimation in the pre-autofocus operation.

When all the calculated smooth differential values are found to be negative values (Yes in step S507), it can be estimated that the values acquired in step S40 belong to the area C in FIG. 15 in step S508. This means that there is no in-focus position in the focus search range the focus lens 72a has moved but the in-focus position is to be found by moving the focus lens 72a in a direction opposite to a previous driving direction.

In case that there is no smooth differential value close to zero (No in S502) or all the calculated values are not positive values (No in S505) nor negative values (No in S507), estimation of the in-focus position is unfeasible so that the in-focus position estimation completes in step S509. The flow proceeds to the AF value storing in step S60.

Figure 16:
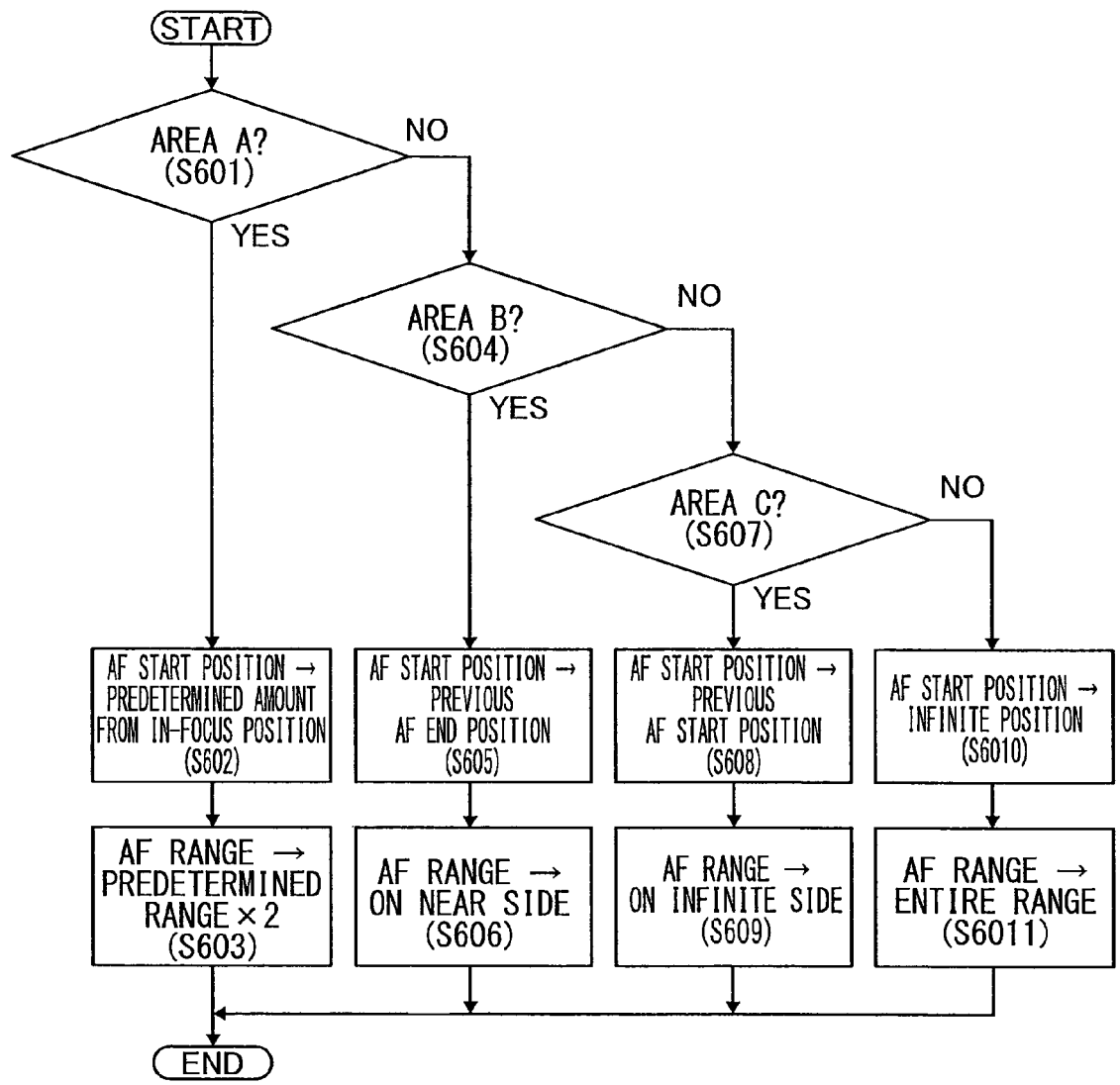
FIG. 16 is a flowchart for detailed pre-autofocus operation.

Next, the AF value storing in step S60 is described in detail with reference to FIG. 16. With the in-focus position estimated to be in the area A in step S50 (Yes in step S601), the drive start position is set to a position moved from the in-focus position to infinite side by a predetermined amount and stored in the SDRAM 103 in step S602. Then, in step S603 the focus search range is set to be twice the range generally set in the pre-autofocus and stored in the SDRAM 103. The stored drive start position and focus search range are used for the AF values to be read from the SDRAM 103 in the next pre-autofocus operation or AF operation. The focus search range can be variable with conditions such as the focal length, an ambient condition (light or dark) or else. In accordance with such a condition, a drive range changing (drive range changing unit) can be performed to change the focus search area. This enables the next pre-autofocus operation to be done in a limited focus search range including the in-focus position, increasing the speed of the AF operation.

When the in-focus position is estimated to be not in the area A (No in step S601) but in the area B (Yes in step S604), the end position of the focus search range in step S40 is set to the next drive start position of the focus lens 72a and stored in the SDRAM 103 in step S605. The driving direction is to be from infinite side to near side and the focus search range is set to a predetermined range from the drive start position and they are also stored in the SDRAM 103 in step S606.

Figure 17:
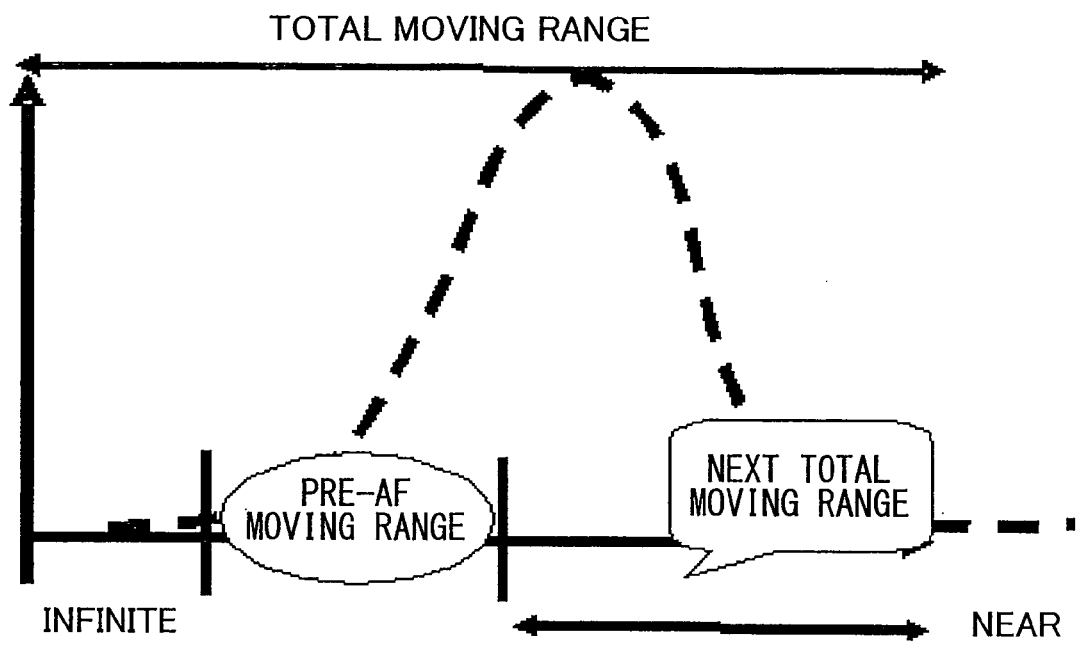
FIG. 17 shows an example of a drive start position and a driving range in the pre-autofocus operation.

As shown in FIG. 17, with the smooth differential value in the area B, the in-focus position is not present in an area on the infinite side of a pre-autofocus area (focus search area) but in an area from the end position of the pre-autofocus area to the near side. Accordingly, the focus lens 72a can start driving from the end position of the focus search range for which the in-focus position estimation has been completed. This can limit the moving range of the focus lens 72a in the AF operation, resulting in increasing the speed of the AF operation.

When the in-focus position is estimated to be in the area C (Yes in step S607) instead of the area A (No in step S601) and the area B (No in step S604), the start position of the focus search range in step S40 is set to the next drive start position of the focus lens 72a and stored in the SDRAM 103 in step S608. The driving direction is to be the near side to infinite side and the focus search range is set to a predetermined range from the drive start position on the infinite side and they are also stored in the SDRAM 103 in step S609.

Figure 18:
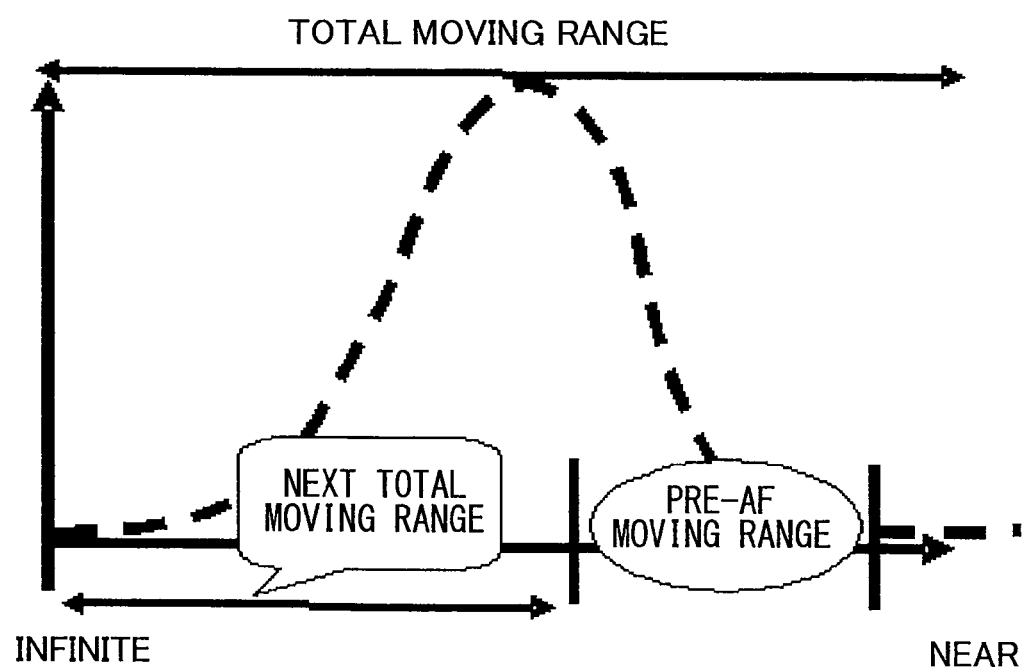
FIG. 18 shows another example of a drive start position and a driving range in the pre-autofocus operation.

As shown in FIG. 18, with the smooth differential value in the area C, the in-focus position is not present in an area on the near side of the pre-autofocus area but in an area from the start position of the pre-autofocus area to the infinite side. Accordingly, the focus lens 72a can start driving to the infinite side from the start position of the focus search range for which the in-focus position estimation has been completed. This can limit the moving range of the focus lens 72a in the AF operation, resulting in increasing the speed of the AF operation.

Further, when the in-focus position is estimated to be in none of the areas A, B, C in No in steps S601, S604, S607, it is determined that estimation of the in-focus position is unfeasible. In step S6010 the next drive start position of the focus lens 72a is set to the infinite end and the focus search range is set to the entire drivable range of the focus lens 72a in step S6011.

As described above, the imaging device according to the first embodiment can gradually approach the in-focus position by repeating the pre-autofocus operation even with a failure to detect the in-focus position at once. Accordingly, since the actual driving range of the imaging lens (focus search range) is limited in advance, it is possible to quickly determine the in-focus position in the AF operation which starts upon a half press to the release button SW and in which the imaging lens is driven in the entire driving range.

Second Embodiment

Figure 19:
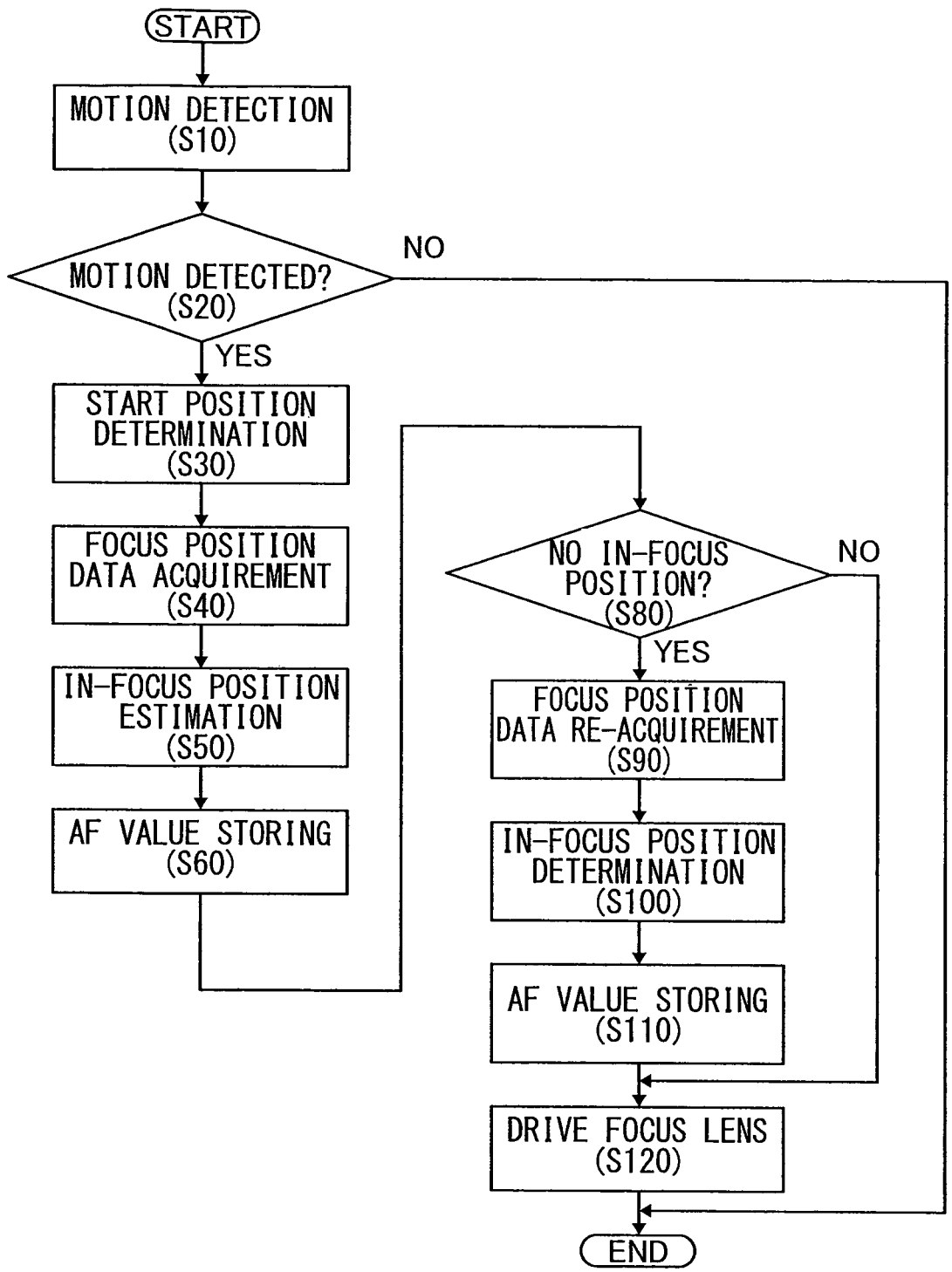
FIG. 19 is a flowchart for another example of pre-autofocus operation of the imaging device according to the present invention.

Next, an imaging method using the imaging device according to the second embodiment of the present invention is described with reference to FIG. 19. FIG. 19 is a flowchart for pre-autofocus operation. In the present embodiment the same steps as those in the first embodiment are given the same numbers and a description thereof is omitted.

First, in the motion detection in step S10 a determination is made on whether or not a motion in a subject image is detected using image data in the AF area (FIG. 5). With no detection of a motion in the subject image (No in step S20), the pre-autofocus operation is completed. The imaging device is always ready to carry out pre-autofocus during a shooting mode so that it does not perform pre-autofocus upon no detection of a motion and restarts it upon detection thereof.

With detection of a motion in the subject image (Yes in step S20), the flow proceeds to start position determination in step S30 to determine a drive start position of the imaging lens for the pre-autofocus. In step S40 (focus position data acquirement) the focus lens 72a is moved from the set drive start position in the focus search area to acquire focus position data. Then, in step S50 (in-focus position estimation) an in-focus position is estimated from a smooth differential value calculated in the focus position data acquirement in step S40. In step S60 (AF value storing) an AF value is stored in the SDRAM 103. The AF value indicates information on the drive start position and driving direction of the focus search area.

In step S80 a determination is made on whether or not the in-focus position is included in the focus search range of the focus position data acquirement (S40). With the in-focus position in the focus search range (No in step S80), the imaging lens is moved to the in-focus position, completing the pre-autofocus operation in step S120. With no in-focus position in the focus search range (Yes in step S80), the AF value stored in step S60 is read from the SDRAM 103, the AF evaluation value is calculated from the drive start position and focus search range indicated by the AF value, and the focus position data is acquired again in step S90. The focus position data re-acquirement in step S90 is similar to step S40.

In step S100 the in-focus position is determined based on the acquired focus position data. In step S110 the AF value is determined based on the in-focus position and stored in the SDRAM 103. Then, in step S120 the imaging lens is moved to the drive start position according to the AF value, thereby completing the pre-autofocus operation.

Figure 20:
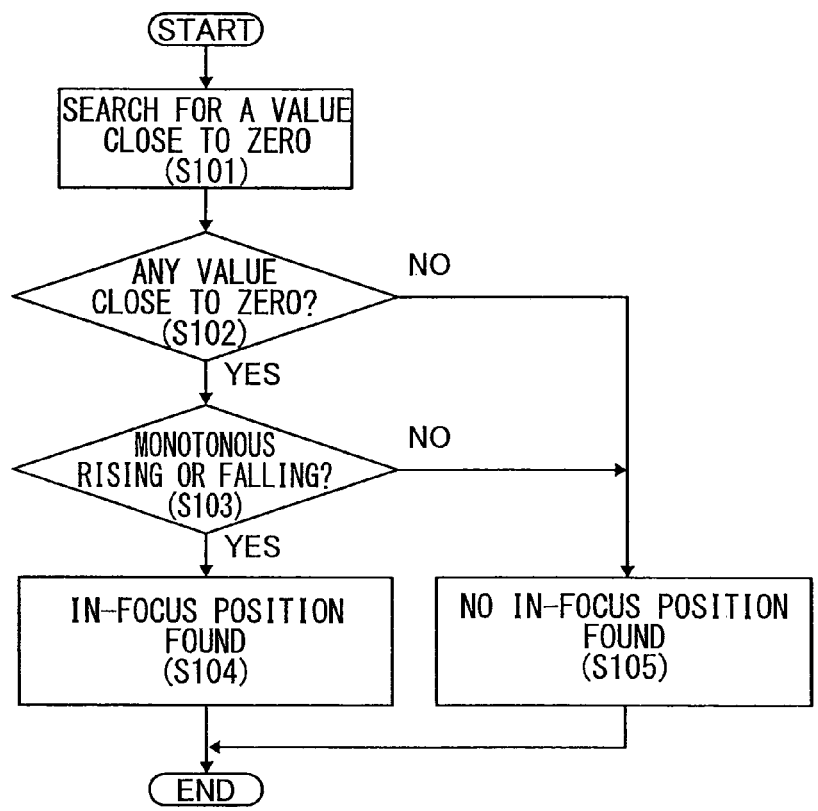
FIG. 20 is a flowchart for detailed pre-autofocus operation.

Now, the in-focus position determination in step S100 is described in detail with reference to FIG. 20. In step S101 a determination is made on whether or not there is a smooth differential value close to zero among the calculated smooth differential values in step S90. With a value close to zero found (Yes in step S102), the periphery value determination is performed in step S103.

The periphery value determination in step S103 is to determine whether or not a smooth differential value around the one close to zero monotonously falls or rises relative to the one close to zero. Specifically, when a smooth differential value acquired before the one close to zero is smaller than the one close to zero as well as a smooth differential value acquired after the one close to zero is larger than the one close to zero, it is determined that the smooth differential value monotonously rises. Oppositely, when a smooth differential value acquired before the one close to zero is larger than the one close to zero as well as a smooth differential value acquired after the one close to zero is smaller than the one close to zero, it is determined that the smooth differential value monotonously falls.

When the monotonous rising or falling or the smooth differential value is determined (Yes in S103), presence of the in-focus position is determined, completing the determination process in step S104. When there is no smooth differential value close to zero (No in S102) and it does not monotonously rise or fall (No in S103), absence of the in-focus position is determined, completing the determination process in step S105.

Figure 21:
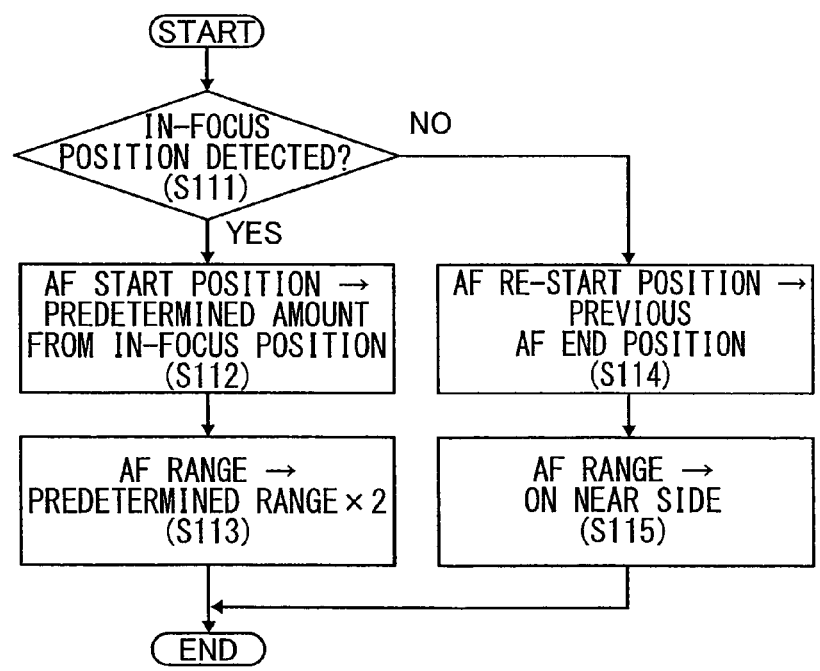
FIG. 21 is a flowchart for detailed pre-autofocus operation.

Next, the AF value storing in step S110 is described with reference to FIG. 21. First, when the in-focus position is determined in step S100 (Yes in step S111), the drive start position of the imaging lens is set to a position moved from the in-focus position by a predetermined amount and the AF value which sets the focus search range to be twice the range predetermined is stored in a predetermined memory area of the SDRAM 103 in step S113. In the present embodiment the doubled focus search range is set to include the in-focus position by way of example, and stored as the AF value to be used for the next pre-autofocus or the AF operation. The in-focus position is preferably variable with a focal length or an ambient condition (dark or light) and so on. The range thereof should be not limited to be twice the general (predetermined) range. Thus, the next AF operation can be processed at a higher speed owing to the limited moving range of the focus lens 72a.

With no in-focus position determined (No in step 111) in the focus determination in step S100, it is determined that determination of the in-focus position is unfeasible. Then, the drive start position of the imaging lens is set to an over-focus position, and the AF value setting the focus search range to the entire drivable range of the imaging lens is stored in a predetermined memory area of the SDRAM 103 (in steps S114, S115). The drive start position is set to the over-focus position so as not to perform the AF operation when no in-focus position can be decided in step S111, since in capturing a subject with a low contrast, the in-focus position may not be able to be determined in the AF operation even after the above pre-autofocus.

Third Embodiment

Next, an imaging method using the imaging device according to the third embodiment of the present invention is described with reference to FIG. 22 which is a flowchart for pre-autofocus operation. In the present embodiment the same steps as those in the first embodiment are given the same numbers and a description thereof is omitted.

Figure 22:
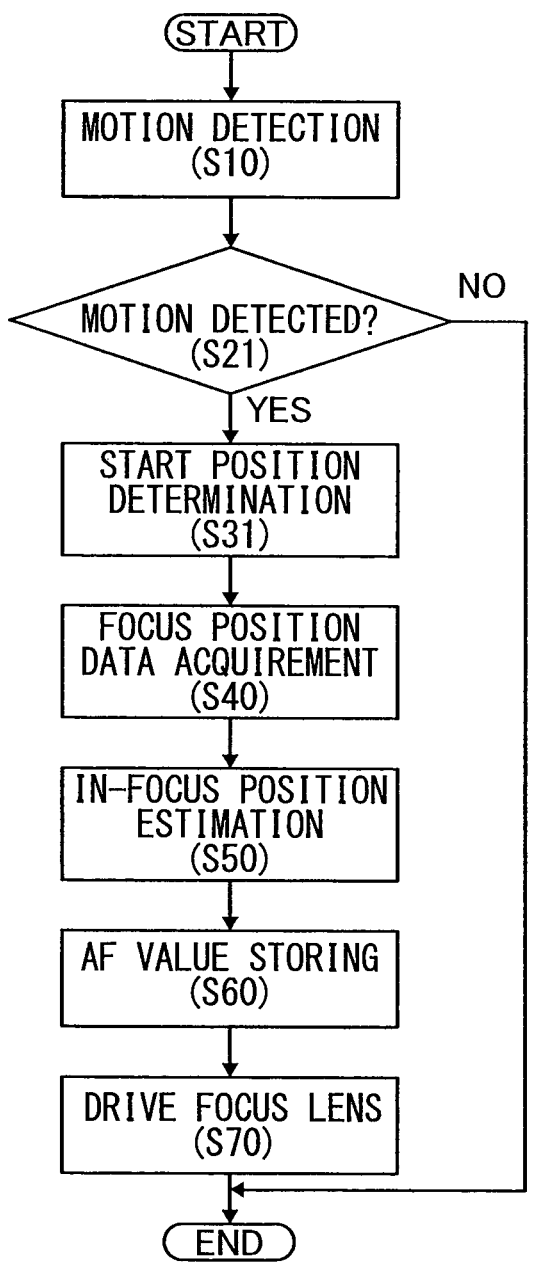
FIG. 22 is a flowchart for detailed pre-autofocus operation.

With reference to FIG. 22, in the motion detection in step S10 a determination is made on whether or not a motion in a subject image is detected. With no detection of a motion in the subject image (No in step S21), the pre-autofocus operation is completed. The imaging device is always ready to carry out pre-autofocus during a shooting mode so that it does not perform the pre-autofocus upon no detection of a motion and restarts it upon detection thereof.

With detection of a motion in the subject image (Yes in step S21), the flow proceeds to start position determination in step S31 to determine a drive start position of the imaging lens for the pre-autofocus. In step S40 (focus position data acquirement) the focus lens 72a is moved from the set drive start position in the search area to acquire focus position data. Then, in step S50 (in-focus position estimation) an in-focus position is estimated from a smooth differential value calculated in the focus position data acquirement in step S40. In step S60 an AF value is obtained from the estimated in-focus position and stored in the SDRAM 103. Based on the stored AF value, the imaging lens is moved to the drive start position, completing the pre-autofocus in step S70.

Figure 23:
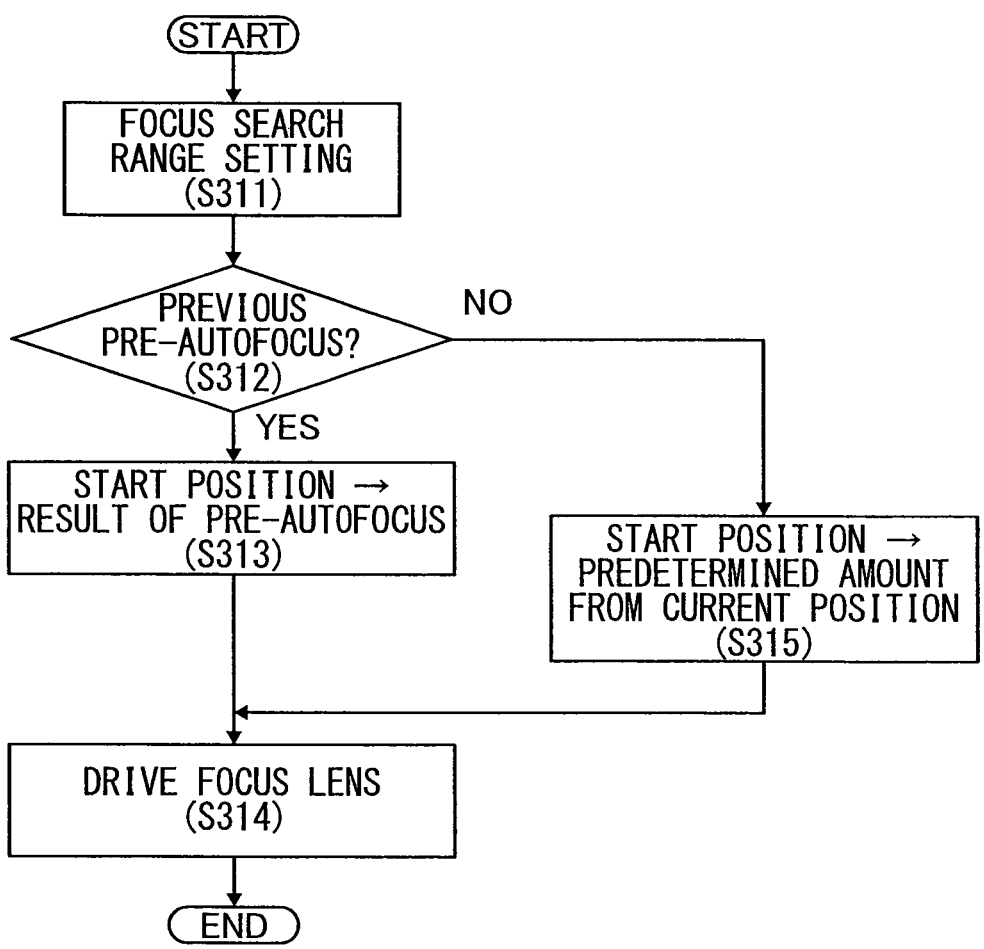
FIG. 23 is a flowchart for detailed pre-autofocus operation.

A start position determination (step S31) as a feature of the present embodiment is described in detail with reference to FIG. 23. First, in step S311 the focus search range is set in accordance with a set shooting mode and a position of the zoom lens 71a constituting the imaging lens.

Then, in step S312 a determination is made on whether or not the pre-autofocus has been performed in accordance with presence or absence of the AF value stored in the SDRAM 103. With the pre-autofocus having been done (Yes in step S312), the AF value is read from the SDRAM 103 to set the drive start position of the focus lens 72a and the in-focus position in step S313.

With the pre-autofocus having not been done (No in step S312), the drive start position is set to a position from the current position of the focus lens 72a by a predetermined amount in the infinite direction in step S315. This is because the imaging lens is set to drive from the infinite to near side in both of the pre-autofocus operation and the AF operation which starts upon a half press to the release button SW1.

In step S314 the focus lens 72a is moved to the drive start position, completing the start position determination.

Figure 24:
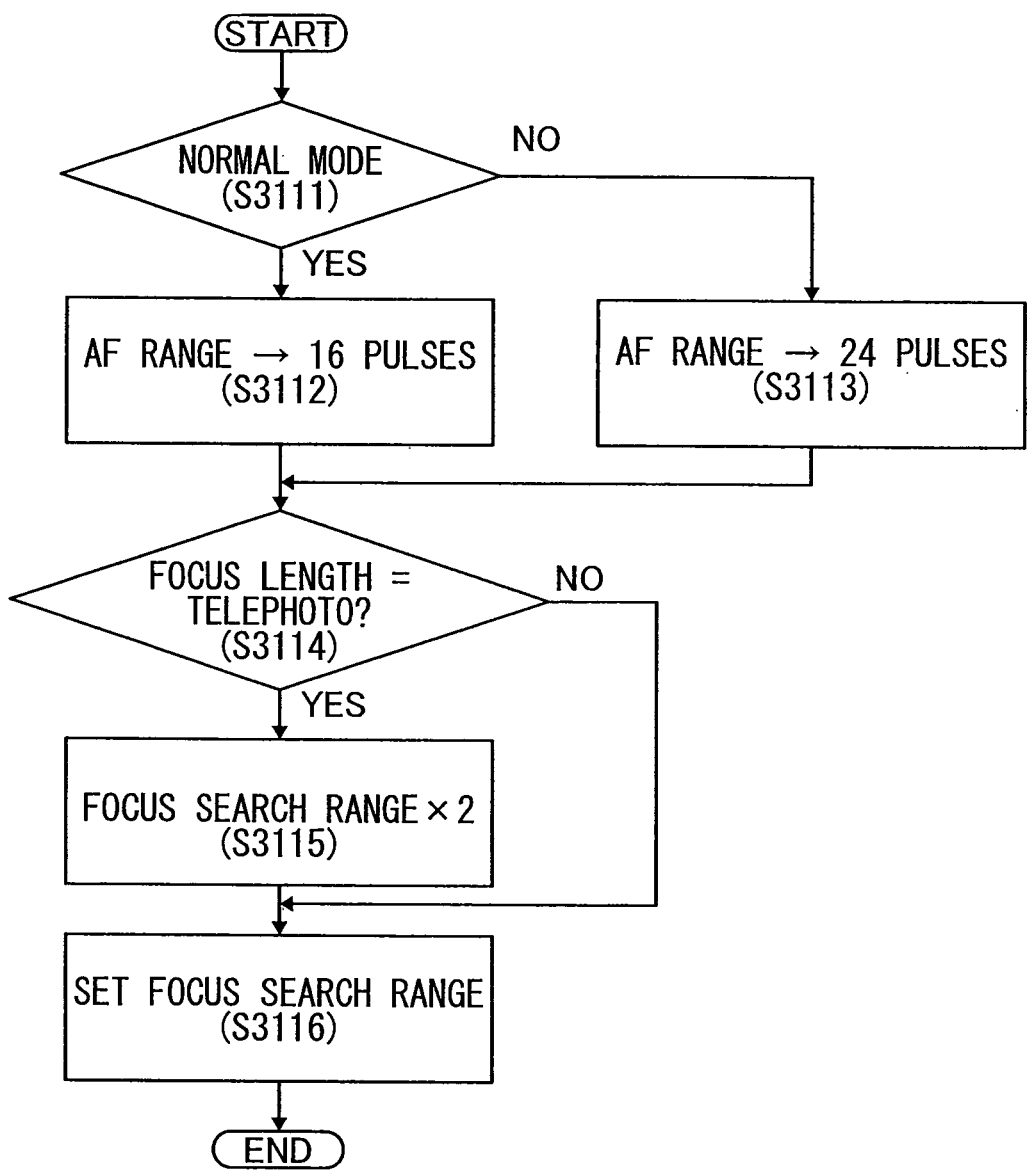
FIG. 24 is a flowchart for another example of detailed pre-autofocus operation.

Next, the focus search range setting in step S311 is described in detail with reference to FIG. 24. The focus search range is preferably to be large enough to calculate AF evaluation values for smooth differential and be narrower than that for the AF operation.

Figure 25A:
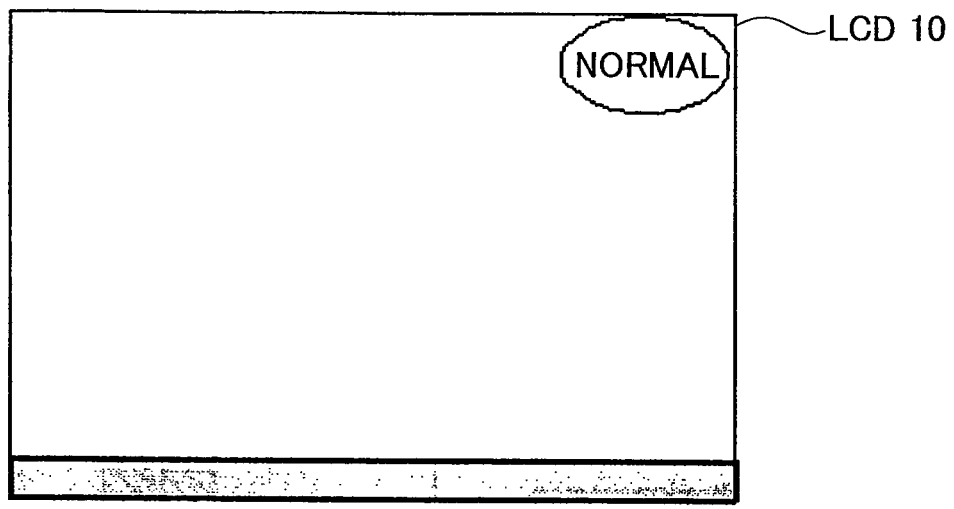
FIGS. 25A, 25B show examples of display of a shooting mode on an LCD.
Figure 25B:
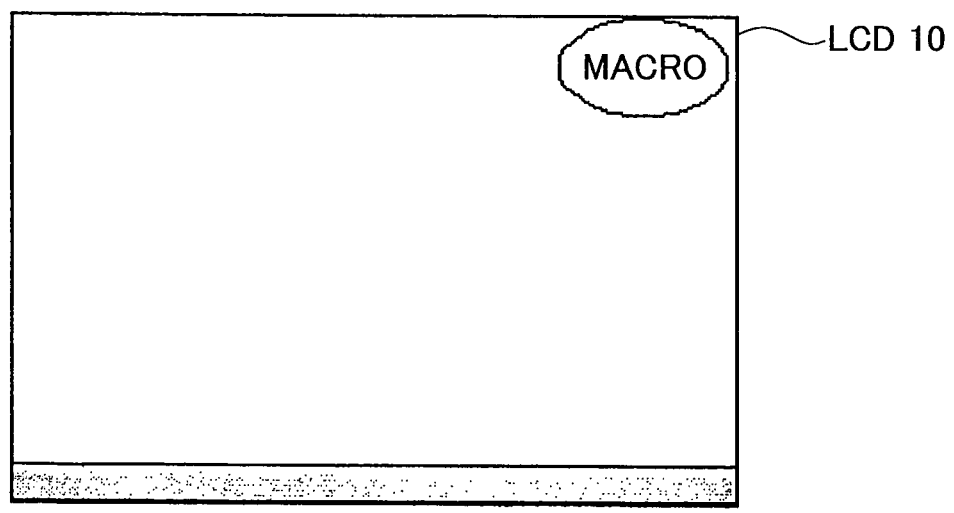

In step S3111 a determination is made on whether or not a set shooting mode is a normal mode. During a viewfinder mode of the imaging device according to the present embodiment, the shooting mode is changeable to a macro mode by pressing the macro switch SW10. A user can visually check a set shooting mode on the LCD 10. FIG. 25A shows a set normal mode, a word, "normal" displayed on the top right of the LCD 10 and FIG. 25B shows a set macro mode, a word, "macro" displayed thereon by way of example.

Figure 26:
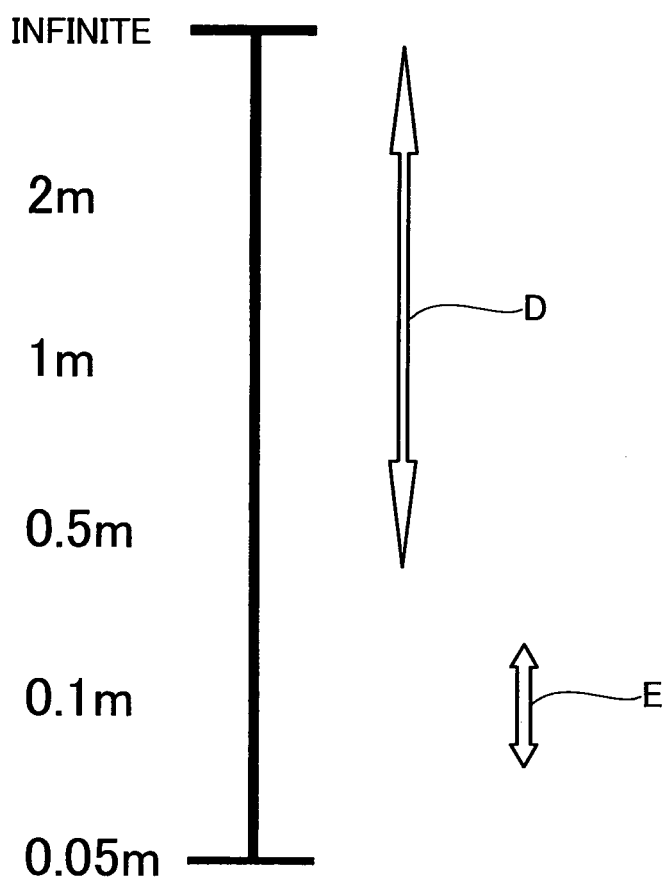
FIG. 26 shows an example of a shooting mode and a focal length of an imaging lens of the imaging device according to the present invention.

Now, a difference in driving resolutions of the imaging lens between the macro mode and the normal mode is described, referring to FIG. 26. FIG. 26 shows an example of the drivable ranges of the imaging lens in the normal and macro modes when the imaging lens is driven at the same pulse rate in the focus search range. At the longitudinal axis being a focal length in the drawing, a focus search range D in the normal mode is from 0.5 m to infinite while a focus search range E in the macro mode is from 7 cm to 12 cm. In such a narrow focus search range, even a very slight motion of a subject can get the subject out of angle of view. Accordingly, it is necessary to set a wider focus search range in the macro mode than in the normal mode.

Referring back to FIG. 24, in the normal mode (Yes in step S3111) the drive pulse rate is set to 16 pulses in the focus search range in step S3112 while in the macro mode (No in step S3111) it is set to 24 pulses in step S3113.

Generally, the driving resolution of the focus lens 72a is more minute in a macro area than in a normal area. Because of this, with the focus lens driven in the focus search range in the macro mode at the same pulse rate as that in the normal mode, an area in which AF evaluation values can be calculated is narrowed, disabling sufficient in-focus determination. In order to reliably estimate the in-focus position, therefore, the drive pulse rate is increased in the macro mode to acquire AF evaluation values on which the smooth differential value bases for in-focus position estimation.

In step S3114 a determination is made on whether or not a focal length is in a telephoto position based on a count of an encoder of the zoom lens 71a, for example. At the focal length being in the telephoto position (Yes in step S3114), the focus search range is set to be twice a predetermined range in steps S3115 and S3116. This is done because the drivable range of the focus lens 72a differs in the wide side and the telephoto side. The drivable range is wider when the focus lens 72a is on the telephoto side than when on the wide side. Thus, a wider focus search range is set in advance when the focus lens 72a is on the telephoto side.

FIG. 31 shows an example of the driving amount and focal length of the imaging lens to show examples of the in-focus position on the wide and telephoto sides. According to the imaging device of the present embodiment, the driving amount of the imaging lens on the telephoto side is twice that on the wide side. A difference in the driving amount should not be limited to "twice". It is preferable that coefficients used for the focus search range are variable depending on various focal lengths.

Without the focal length being in the telephoto position (No in step S3114), the focus search range is set to a predetermined range in step S3116, completing the focus search range setting in step S311.

Fourth Embodiment

Figure 27:
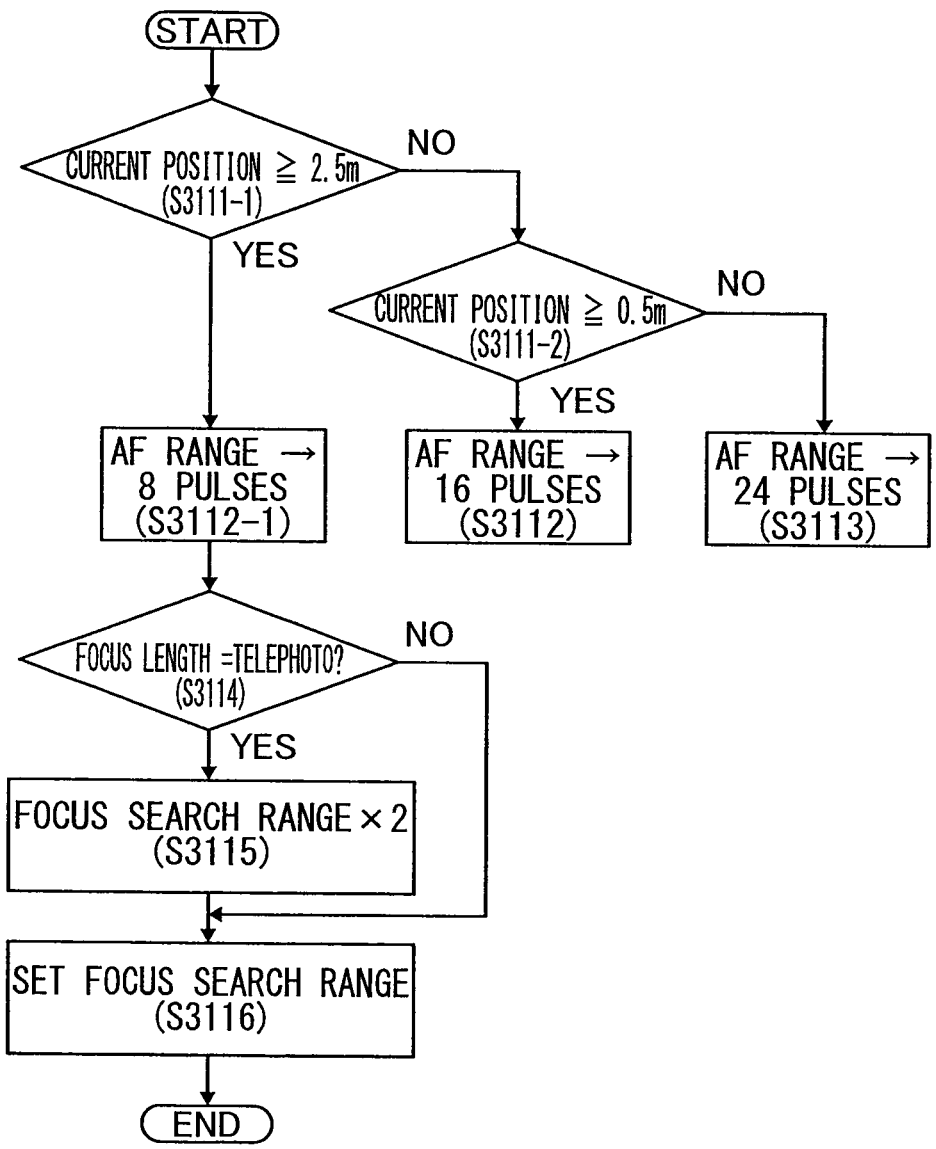
FIG. 27 is a flowchart for another example of detailed pre-autofocus operation.

Next, an imaging method using the imaging device according to the fourth embodiment of the present invention is described with reference to FIG. 27. The present embodiment concerns another example of the focus search range setting in the third embodiment. In the present embodiment the same steps as those in the third embodiment are given the same numbers and a description thereof is omitted.

In step S3111-1, a determination is made on whether or not the focus lens 72a is currently in a position equivalent to the focal length of 2.5 m or more. The current lens position of the focus lens 72a is translated into a focal length based on property of the focus lens.

At the focal length being 2.5 m or more (Yes in step S3111-1), upon determining that a subject is around the focal length, the AF evaluation values are acquired only for about 2.5 m area or far side area to calculate a smooth differential value for the in-focus position estimation. The driving pulse rate is set to 8 pulses in the focus search range in step S3112-1.

At the focal length being 2.5 m less or 0.5 m or more (Yes in step S3111-2), to widen the focus search range, the driving pulse rate is set to 16 pulses in step S3112. At the focal length being 0.5 m or less (No in step S3111-2), since the focus lens 72a is in a close range, the driving pulse rate is set to 24 pulses in step S3113.

In step S3114 a determination is made on whether or not the focal length is in the telephoto position based on a count of the encoder of the zoom lens 71a. The drivable range of the focus lens 72a differs in the wide side and the telephoto side. The drivable range is wider when the focus lens 72a is on the telephoto side than when on the wide side. Also, the driving resolution thereof differs in the wide side and the telephoto side, as in the macro and normal modes. The focal length on the telephoto side is twice that on the wide side, for example.

Accordingly, at the focal length being on the telephoto side (Yes in step S3114), the focus search range is set to be twice a predetermined range in steps S3115, S3116. Without the focal length being on the telephoto side (No in step S3114), the focus search range is set to the predetermined range in step S3116.

Fifth Embodiment

Next, an imaging method using the imaging device according to the fifth embodiment of the present invention is described. The present embodiment concerns another example of the motion detection in the first to fourth embodiments. In the motion detection according to the present embodiment, thresholds for determining motion of the subject are made variable in accordance with position of the zoom lens and operation mode of the imaging device.

In the motion detection a piece of image data (hereinafter, referred to as frame) is acquired by each VD signal to calculate a difference between previous and current frames and output a resultant as a moving pixel number. Difference calculation is done only in the AF area in FIG. 5. The moving pixel number is a positive or negative integral value and indicates a moving direction of an image. A motion detection is determined when the sum of moving pixel numbers for each frame exceeds a certain value or a detection threshold. The detection threshold can be arbitrary, 30 pixels, for example.

Upon detection of a motion in the subject, an integrated (total) moving pixel number is reset to zero and a moving pixel number for each frame is added again. The integrated moving pixel number is reset when the moving pixel number becomes zero or a moving direction of an image is reversed from a previous result.

Now, how the detection threshold is changed according to a zoom position of the imaging lens is described. Zoom magnification is changeable in the viewfinder mode with the wide-angle zoom switch SW3 and the telescopic zoom switch SW4. In default it is set to wide end. In accordance with the zoom position, wide end or telephoto end, an image on the LCD 10 greatly differs. In pointing a camera at a same subject with a same distance, an image on the display appears very large at zooming the telephoto end. Accordingly, moving the camera with a same amount at the telephoto end, the moving pixel number calculated will be larger than at the wide end. Because of this, in a zoom position at the telephoto end, the detection threshold is set to a larger value than at the wide end.

Figure 28:
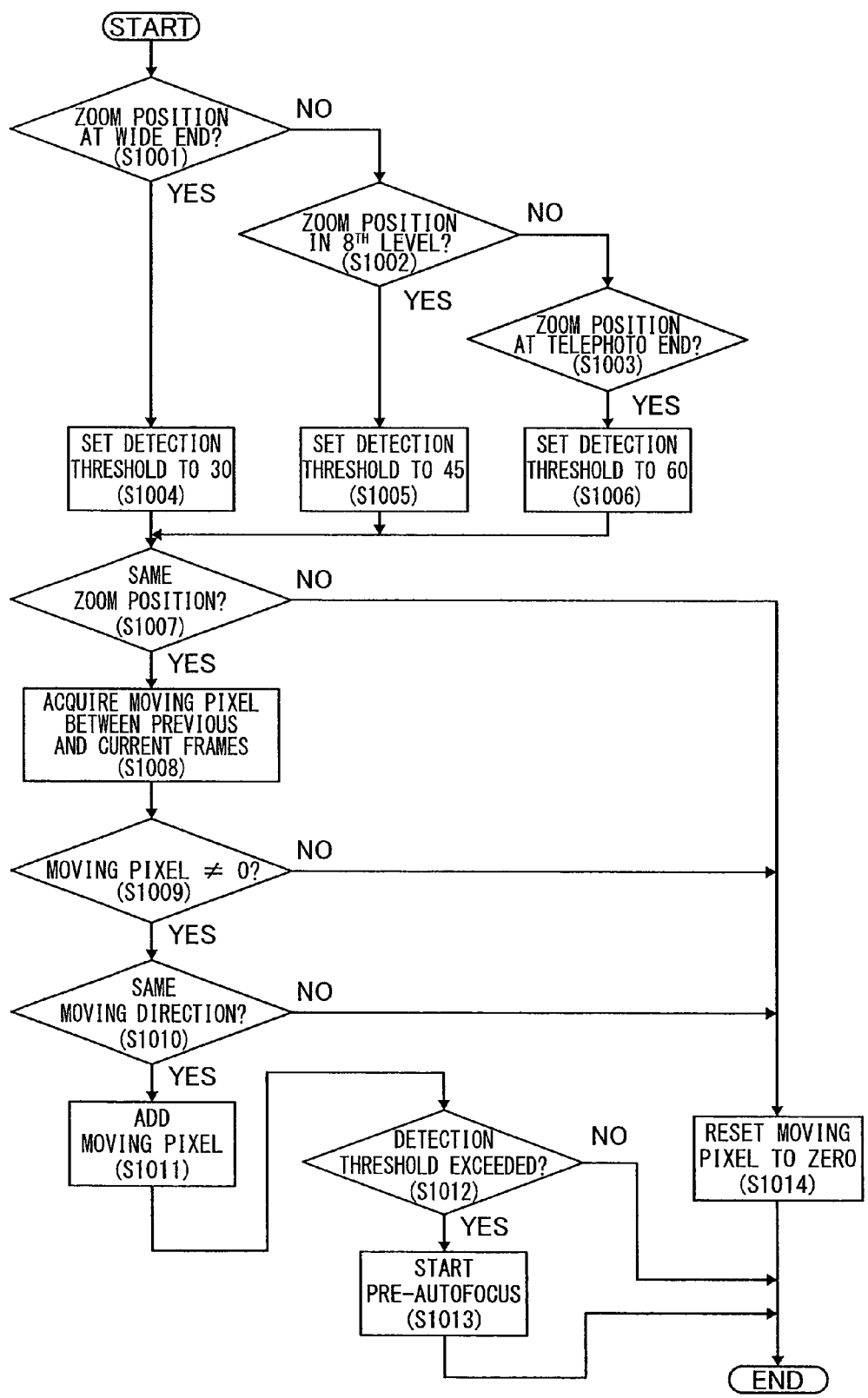
FIG. 28 is a flowchart for one example of detailed motion detection in the pre-autofocus operation.

The motion detection according to the present embodiment is described in detail with reference to FIG. 28. In the present embodiment the zoom position can be set in 16 levels from the wide end to the telephoto end. Upon power-on of the imaging device, the motion detection starts when the device is in the viewfinder mode, and a current zoom position is determined in steps S1001 to S1003. In the zoom position being at the wide end, the detection threshold is set to 30 in step S1004. In the zoom position being in the eighth level, the detection threshold is set to 45 in step S1005. In the zoom position being at the telephoto end, the detection threshold is set to 60 in step S1006.

In step S1007 a determination is made on whether or not the zoom position is changed from that for the previous frame. With a change of the zoom position (No in step S1007), the total moving pixel number is reset to zero, completing the operation in step S1014. Without a change (Yes in step S1007), a difference in pixels of the previous and current frames is calculated in step S1008. At no moving pixel found (No in step S1009), the total moving pixel number is reset to zero, completing the operation in step S1014. At the moving pixel being other than zero, a determination is made on whether or not the moving direction of the imaging lens is changed from that for the previous frame in step S1010. With a change in the moving direction (No in step S1010), the total moving pixel number is reset to zero, completing the operation in step S1014.

Meanwhile, without a change in the moving direction, the moving pixel is added in step S1011. In step S1012 a determination is made on whether or not the total moving pixel number exceeds the previously set detection threshold. With the total number being over the detection threshold (Yes in step S1012), the pre-autofocus is started in step S1013.

As described above, according to the imaging device in the present embodiment, it is possible to variably set an optimal detection threshold for each zoom position, preventing too sensitive motion detection which causes extraneous power consumption and too insensitive motion detection which causes a delay and inefficiency in the pre-autofocus operation.

Sixth Embodiment

Next, an imaging method using the imaging device according to the sixth embodiment of the present invention is described. The present embodiment concerns another example of the motion detection in the fifth embodiment. In the motion detection a difference between previous and current frames is calculated and a resultant is output as a moving pixel number. Upon detection of a motion in the subject exceeding the detection threshold, the integrated (total) moving pixel number is reset to zero and a moving pixel number for each frame is added again. The integrated moving pixel number is reset when the moving pixel number becomes zero or a moving direction of an image is reversed from a previous result.

During the viewfinder mode, the imaging device is turned into the macro mode by pressing the macro switch SW10. In the macro mode it is able to shoot a subject in a very close range which cannot be shot in the normal mode. Therefore, even a slight motion of a subject causes an increase in the moving pixel number of image data in the AF area (FIG. 5). This is the same as the zoom position at the telephoto end in the fifth embodiment. It is preferable to set a larger detection threshold in the macro mode than in the normal mode.

Figure 29:
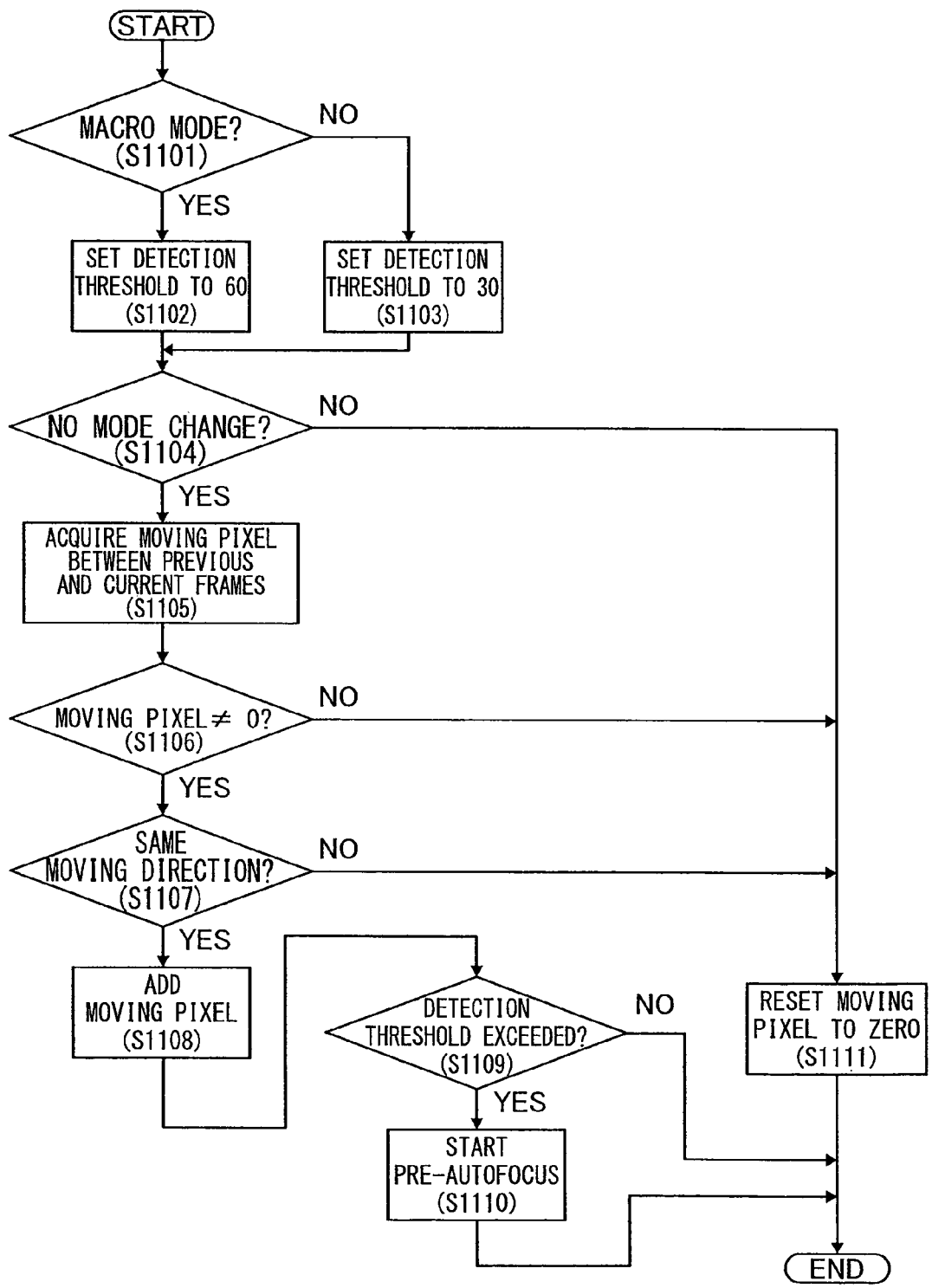
FIG. 29 is a flowchart for another example of detailed motion detection in the pre-autofocus operation.

Now, the motion detection according to the present embodiment is described with reference to FIG. 29. In step S1101 a determination is made on whether or not the imaging device operates in the macro mode. In the macro mode the detection threshold is set to 60 in step S1102 while in a mode other than the macro mode the detection threshold is set to 30 in step S1103.

In step S1104, a determination is made on whether or not there is a change in shooting mode from the previous frame. With a change (No in step S1104), the total moving pixel number is reset to zero, completing the operation in step S1111. Without a change (Yes in step S1104), a difference in pixels of the previous and current frames is calculated in step S1105. At no moving pixel found (No in step S1106), the total moving pixel number is reset to zero, completing the operation in step S1111. At the moving pixel being other than zero, a determination is made on whether or not the moving direction of the imaging lens is changed from that for the previous frame in step S1107. With a change in the moving direction (No in step S1107), the total moving pixel number is reset to zero, completing the operation in step S1111.

Meanwhile, without a change in the moving direction, the moving pixel is added in step S1108. In step S1109 a determination is made on whether or not the total moving pixel number exceeds the previously set detection threshold. With the total number being over the detection threshold (Yes in step S1109), the pre-autofocus is started in step S1110.

As described above, according to the imaging device in the present embodiment, it is possible to variably set an optimal detection threshold for each zoom position, preventing too sensitive motion detection which causes extraneous power consumption and too insensitive motion detection which causes a delay and inefficiency in the pre-autofocus operation.

Seventh Embodiment

Next, an imaging method using the imaging device according to the seventh embodiment of the present invention is described. The present embodiment concerns another example of the motion detection in the fifth embodiment. In the motion detection a difference between previous and current frames is calculated and a resultant is output as a moving pixel number. Upon detection of a motion in the subject exceeding the detection threshold, an integrated (total) moving pixel number is reset to zero and a moving pixel number for each frame is added again. The integrated moving pixel number is reset when the moving pixel number becomes zero or a moving direction of an image is reversed from a previous result.

During the viewfinder mode, the imaging device can be turned into a certain scene mode which is selectable from a plurality of scene modes with the mode dial SW2. Selecting a scene mode enables easy setting of shooting parameters (aperture value, white balance and else) in accordance with photographic conditions.

For example, when a sport mode is selected with the mode dial SW2, a subject is likely to constantly move. It is preferable to set a lower detection threshold to focus an exact moment which a user aims to capture. Also, in a scenery mode a subject is expected to be in a far distance and hardly move. Since an expected moving pixel number is very small even with a camera moved, it is preferable to set a lower detection threshold (15 pixels in the present embodiment).

Figure 30:
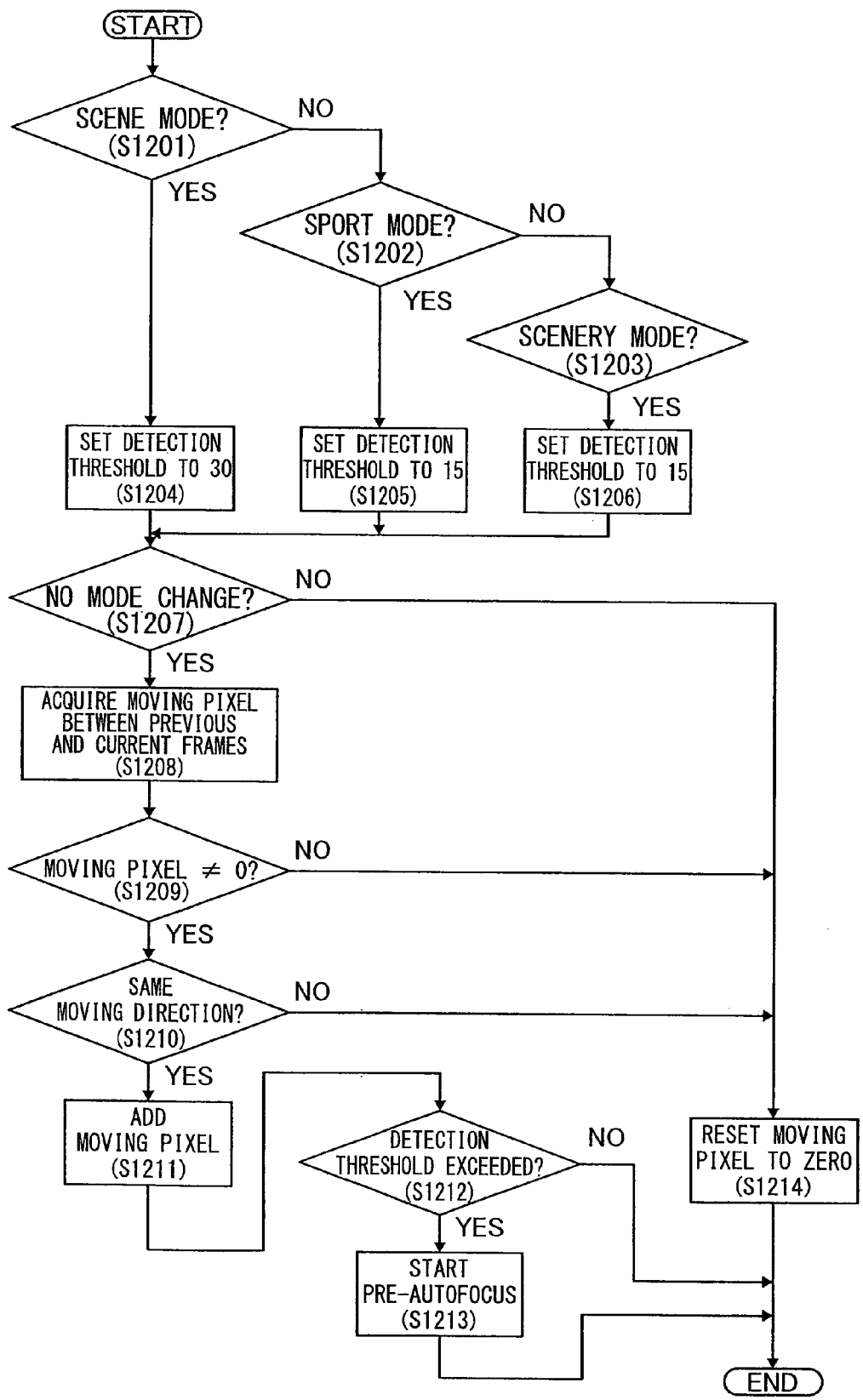
FIG. 30 is a flowchart for another example of detailed motion detection in the pre-autofocus operation.

The motion detection according to the present embodiment is described with reference to FIG. 30. In step S1201 a determination is made on whether or not the imaging device operates in a scene mode. In a mode other than the scene mode, the detection threshold is set to 30 in step S1204. In the scene mode (Yes in step S1201), a type of the scene mode is determined. In the sport mode selected (Yes in step S1202), the detection threshold is set to 15 in step S1205. In the scenery mode selected, the detection threshold is set to 15 in step S1206.

In step S1207 a determination is made on whether or not there is a change in the scene mode from the previous frame. With a change (No in step S1207), the total moving pixel number is reset to zero, completing the operation in step S1214. Without a change (Yes in step S1207), a difference in pixels of the previous and current frames is calculated in step S1208. At no moving pixel found (No in step S1209), the total moving pixel number is reset to zero, completing the operation in step S1214. At the moving pixel being other than zero, a determination is made on whether or not the moving direction of the imaging lens is changed from that for the previous frame in step S1210. With a change in the moving direction (No in step S1210), the total moving pixel number is reset to zero, completing the operation in step S1214.

Meanwhile, without a change in the moving direction (Yes in step S1210), the moving pixel is added in step S1211. In step S1212 a determination is made on whether or not the total moving pixel number exceeds the previously set detection threshold. With the total number being over the detection threshold (Yes in step S1212), the pre-autofocus is started in step S1213.

As described above, according to the imaging device in the present embodiment, it is possible to variably set an optimal detection threshold for each zoom position, preventing too sensitive motion detection which causes extraneous power consumption and too insensitive motion detection which causes a delay and inefficiency in the pre-autofocus operation Moreover, the imaging device according to any one of the above embodiments can estimate an in-focus position in a very small focus search range upon detecting a motion of a subject, and quickly perform the AF operation by setting the drive start position of the imaging lens for the next focus detection.

Furthermore, the imaging device according to any one of the above embodiments can change the focus search range according to a position of the imaging lens upon detecting a motion of a subject to estimate an in-focus position and can quickly perform the AF operation by setting the drive start position of the imaging lens for the next focus detection.

The present invention is applicable to an imaging device mounted in a hand-held device with a camera function and an imaging method using such an imaging device.

Although the present invention has been described in terms of exemplary embodiments, it is not limited thereto. It should be appreciated that variations may be made in the embodiments described by persons skilled in the art without departing from the scope of the present invention as defined by the following claims.

The invention claimed is:

1. An imaging device comprising:
an imaging lens;
an imaging unit which acquires image data based on an optical image of a subject received via the imaging lens;
a motion detector which detects motion of the subject from image data sequentially acquired from the imaging unit;
a focus detector which calculates focus position data based on the image data acquired via the imaging lens which is driven in a second drive range smaller than a first drive range in which the imaging lens is movable upon a press of a release operation member, in response to detection of motion of the subject by the motion detector; and
an in-focus position estimating unit which estimates an in-focus position based on the calculated focus position data, and
wherein, when the in-focus position is not present in the second drive range, and the release operation member is pressed, an end position of the second drive range adjacent to the estimated in-focus position is set to a drive start position of the imaging lens.

2. The imaging device according to claim 1, wherein the in-focus position estimating unit sets at least one of a drive start position and a driving direction of the imaging lens based on the focus position data so that the imaging lens approaches the in-focus position.

3. The imaging device according to claim 1, wherein the focus position data is a resultant of a smooth differential operation based on an AF evaluation value calculated from the image data.

4. The imaging device according to claim 3, wherein the AF evaluation value is obtained by integrating a difference in brightness of neighboring pixels constituting the image data.

5. The imaging device according to claim 3, wherein the smooth differential operation is to calculate a sum of values obtained by weighted integration of a difference in AF evaluation values of neighboring pixels, and a weight coefficient used in the weighted integration is set so that the larger the difference in the AF evaluation values, the larger the weight coefficient.

6. The imaging device according to claim 2, wherein the in-focus position estimating unit is configured to move the imaging lens to the drive start position after estimating the in-focus position.

7. The imaging device according to claim 1, wherein when failing to estimate the in-focus position, the in-focus position estimating unit is configured to change the drive start position of the imaging lens and calculate the focus position data again.

8. The imaging device according to claim 1, wherein the focus detector comprises a drive range changing unit configured to change a drive range of the imaging lens according to a predetermined condition.

9. An imaging device according to claim 8, wherein the predetermined condition is a position of the imaging lens when the focus detector starts operating.

10. The imaging device according to claim 8, wherein the predetermined condition is a shooting mode when the focus detector starts operating.

11. An imaging device according to claim 8, wherein the predetermined condition is a focal length when the focus detector starts operating.

12. An imaging method comprising:
providing an imaging device which includes as imaging lens, an imaging unit which acquires image data based on an optical image of a subject received via the imaging lens, a motion detector, a focus detector, and an in-focus position estimating units;
causing the motion detector to detect motion of the subject from image data sequentially acquired from the imaging units;
causing the focus detector to calculate focus position data based on the image data acquired via the imaging lens, and wherein the imaging lens is driven in a second drive range smaller than a first drive range in which the imaging lens is movable upon a press of a release operation member, in response to detection of motion of the subject by the motion detector; and
causing the an in-focus position estimating unit to estimate an in-focus position based on the calculate focus position data, and
when the in-focus position is not present in the second drive range, and the release operation member is pressed, causing an end position of the second drive range adjacent to the estimated in-focus position to be set to a drive start position of the imaging lens.

* * * * *